(12) United States Patent
Liensberger et al.

(10) Patent No.: US 11,089,132 B2
(45) Date of Patent: Aug. 10, 2021

(54) EXTENSIBILITY FOR CONTEXT-AWARE DIGITAL PERSONAL ASSISTANT

(71) Applicant: Microsoft Technology Licensing, LLC, Redmond, WA (US)

(72) Inventors: Christian Liensberger, Bellevue, WA (US); Pauline Chao, Seattle, WA (US); Henrik Frystyk Nielsen, Hunts Point, WA (US); Harris Syed, Redmond, WA (US); Jonathan E. Hamaker, Issaquah, WA (US); Paul S. Bloom, Seattle, WA (US); Keith C. Herold, Seattle, WA (US); Erez Altus, Tel-Aviv (IL); Hen Fitoussi, Ramat Hasharon (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 8 days.

(21) Appl. No.: 15/220,643

(22) Filed: Jul. 27, 2016

(65) Prior Publication Data

US 2017/0289305 A1 Oct. 5, 2017

Related U.S. Application Data

(60) Provisional application No. 62/314,966, filed on Mar. 29, 2016.

(51) Int. Cl.
*H04L 29/08* (2006.01)
*H04W 4/029* (2018.01)
(Continued)

(52) U.S. Cl.
CPC ............ *H04L 67/32* (2013.01); *G06F 3/0481* (2013.01); *G06F 3/0484* (2013.01); *G06N 5/048* (2013.01);
(Continued)

(58) Field of Classification Search
CPC ......... H04L 67/32; H04L 67/22; H04L 67/34; H04L 67/02; G06N 3/0484; G06N 3/0481;
(Continued)

(56) References Cited

U.S. PATENT DOCUMENTS 6,553,358 B1 4/2003 Horvitz
7,343,312 B2 3/2008 Capek et al.
(Continued)

OTHER PUBLICATIONS

"International Search Report and Written Opinion Issued in PCT Application No. PCT/US2017/023704", dated May 15, 2017, 11 Pages.

(Continued)

*Primary Examiner* — Thomas J Dailey
*Assistant Examiner* — Lam H Duong
(74) *Attorney, Agent, or Firm* — Wade IP Law PLLC

(57) ABSTRACT

Techniques are described herein that are capable of providing extensibility with regard to a context-aware digital personal assistant. For instance, a description of a capability of a target (e.g., a software target) may be received. Examples of a target include but are not limited to an application (e.g., a software application), a service, a bot, and a website. In a first example, a digital personal assistant may be caused to perform operation(s) based at least in part on a context of a user. In a second example, whether the digital personal assistant performs operation(s) that are configured to be triggered by first aspect(s) of the context of the user is controlled based at least in part on second aspect(s) of the context of the user. The operation(s) include notifying the user of the capability and/or implementing the capability on behalf of the user.

21 Claims, 7 Drawing Sheets

(51) Int. Cl.
*G06Q 10/10* (2012.01)
*G06Q 10/06* (2012.01)
*G06F 3/0481* (2013.01)
*G06F 3/0484* (2013.01)
*G06N 5/04* (2006.01)
*H04W 4/14* (2009.01)

(52) U.S. Cl.
CPC .......... *G06Q 10/06* (2013.01); *G06Q 10/063* (2013.01); *G06Q 10/06311* (2013.01); *G06Q 10/10* (2013.01); *H04L 67/02* (2013.01); *H04L 67/22* (2013.01); *H04L 67/34* (2013.01); *H04W 4/029* (2018.02); *H04W 4/14* (2013.01)

(58) Field of Classification Search
CPC ......... H04W 4/14; H04W 4/029; H04W 4/02; G06Q 10/063; G06Q 10/06; G06Q 10/10; G06Q 10/06311; G06F 3/0484; G06F 3/0481
USPC ........................................................ 702/206
See application file for complete search history.

(56) References Cited

U.S. PATENT DOCUMENTS

| | | | |
|---|---|---|---|
| 7,584,253 | B2 | 9/2009 | Curbow et al. |
| 7,679,518 | B1 | 3/2010 | Pabla et al. |
| 7,693,736 | B1 | 4/2010 | Chu et al. |
| 7,703,048 | B2 | 4/2010 | Alford et al. |
| 7,707,256 | B2 | 4/2010 | Rollin et al. |
| 8,000,453 | B2 | 8/2011 | Cooper et al. |
| 8,346,590 | B2 | 1/2013 | Norton et al. |
| 8,375,034 | B2 | 2/2013 | Norton et al. |
| 8,483,375 | B2 | 7/2013 | Dhara et al. |
| 8,495,211 | B2 * | 7/2013 | Kuno .................... H04L 67/16 709/225 |
| 8,504,404 | B2 | 8/2013 | Norton |
| 8,719,335 | B2 | 5/2014 | Venkatesh et al. |
| 8,743,171 | B2 | 6/2014 | Hiller et al. |
| 8,965,922 | B2 | 2/2015 | Kandogan et al. |
| 9,195,972 | B2 | 11/2015 | Gopinath et al. |
| 9,374,327 | B2 | 6/2016 | Rao DV |
| 10,007,886 | B1 * | 6/2018 | Khvostichenko ..... G06F 3/0481 |
| 10,007,897 | B2 | 6/2018 | Possing et al. |
| 10,163,074 | B2 | 12/2018 | Wilkerson et al. |
| 2002/0069191 | A1 | 6/2002 | Ellis et al. |
| 2003/0004776 | A1 | 1/2003 | Perrella et al. |
| 2003/0167167 | A1 | 9/2003 | Gong |
| 2003/0217073 | A1 | 11/2003 | Walther et al. |
| 2004/0128304 | A1 | 7/2004 | Rokosz |
| 2006/0200374 | A1 | 9/2006 | Nelken et al. |
| 2006/0236269 | A1 | 10/2006 | Borna |
| 2008/0113655 | A1 * | 5/2008 | Angelhag ................ H04L 67/16 455/414.2 |
| 2008/0300944 | A1 | 12/2008 | Surazski et al. |
| 2009/0063270 | A1 * | 3/2009 | Bengtsson ............. G06Q 30/02 705/14.14 |
| 2009/0063993 | A1 | 3/2009 | Nyamgondalu |
| 2009/0077244 | A1 | 3/2009 | Trang et al. |
| 2009/0132329 | A1 | 5/2009 | Lam et al. |
| 2009/0187531 | A1 | 7/2009 | Singh et al. |
| 2009/0204612 | A1 * | 8/2009 | Keshavarz-Nia ....... H04L 67/16 |
| 2009/0234690 | A1 * | 9/2009 | Nikipelo ................ G06Q 10/06 705/7.13 |
| 2010/0070877 | A1 | 3/2010 | Scott et al. |
| 2010/0223089 | A1 | 9/2010 | Godfrey et al. |
| 2010/0280748 | A1 * | 11/2010 | Mundinger ........ G01C 21/3423 701/532 |
| 2011/0066468 | A1 | 3/2011 | Huang et al. |
| 2011/0076994 | A1 | 3/2011 | Kim et al. |
| 2012/0004942 | A1 | 1/2012 | Callanan et al. |
| 2012/0030194 | A1 | 2/2012 | Jain |
| 2012/0271676 | A1 | 10/2012 | Aravamudan et al. |
| 2013/0085886 | A1 * | 4/2013 | Satish .................... G06Q 30/02 705/26.7 |
| 2013/0275875 | A1 * | 10/2013 | Gruber .................... G06F 3/167 715/728 |
| 2013/0311997 | A1 * | 11/2013 | Gruber .................. G06F 9/4843 718/102 |
| 2014/0108085 | A1 | 4/2014 | Henriksen et al. |
| 2014/0114705 | A1 * | 4/2014 | Bashvitz .............. G06Q 10/047 705/5 |
| 2014/0115456 | A1 | 4/2014 | White et al. |
| 2014/0185417 | A1 | 7/2014 | Zhao |
| 2014/0245140 | A1 * | 8/2014 | Brown .............. H04M 1/72519 715/708 |
| 2014/0257902 | A1 | 9/2014 | Moore et al. |
| 2014/0259178 | A1 | 9/2014 | Karaa et al. |
| 2014/0278405 | A1 | 9/2014 | Peters et al. |
| 2014/0297758 | A1 | 10/2014 | Kidron et al. |
| 2014/0317502 | A1 * | 10/2014 | Brown .................... G06Q 10/02 715/706 |
| 2015/0006221 | A1 | 1/2015 | Mermelstein |
| 2015/0058425 | A1 | 2/2015 | Nathan et al. |
| 2015/0141063 | A1 * | 5/2015 | Lawless .................. H04W 4/12 455/466 |
| 2015/0169336 | A1 * | 6/2015 | Harper .................... G06F 9/453 715/706 |
| 2015/0193819 | A1 | 7/2015 | Chang |
| 2015/0199649 | A1 | 7/2015 | Weinberg et al. |
| 2015/0229728 | A1 * | 8/2015 | Savolainen ............. H04L 67/22 707/722 |
| 2015/0293904 | A1 * | 10/2015 | Roberts ................. G06F 40/169 704/9 |
| 2015/0324753 | A1 | 11/2015 | Dantuluri et al. |
| 2015/0339679 | A1 | 11/2015 | Lefor |
| 2015/0358414 | A1 | 12/2015 | Mehta et al. |
| 2015/0382047 | A1 * | 12/2015 | Van Os .................... G06F 16/73 725/38 |
| 2016/0055215 | A1 | 2/2016 | Kauwe |
| 2017/0014068 | A1 * | 1/2017 | Gotoh .................... G16H 20/30 |
| 2017/0236097 | A1 | 8/2017 | Smith |

OTHER PUBLICATIONS

Wieland, et al., "Towards Context-aware Workflows", In Proceedings of the Workshops and Doctoral Consortium, vol. 2, Jun. 2007, pp. 1-15.

Dunlop, et al., "Digital Personal Assistant for the Enterprise", In White Paper of IT@Intel, Feb. 2013, pp. 1-8.

"Being Digital: the post app era", Published on: Oct. 2015 Available at: http://www.openstream.com/media/openstream_virtual_assistants_position_paper.pdf, 8 pages.

Smalley, Eric., "Siri Points the Way to Analytics-Driven Enterprise Assistants", Published on: May 1, 2013 Available at: http://data-informed.com/siri-points-the-way-to-analytics-driven-enterprise-assistants/, 3 pages.

Myers, et al., "An Intelligent Personal Assistant for Task and Time Management", In AI Magazine vol. 28, No. 2, Jun. 15, 2007, pp. 47-61.

Kofod-Petersen, et al., "Case-Based Situation Assessment in a Mobile Context-Aware System", In Proceedings of Workshop on Artificial Intgelligence for Mobil Systems, Oct. 2003, 8 pages.

Gupta, Rakhi Misuriya., "MOBISPA: A Reference Framework for Mobile As A Secure Personal Assistant", In Journal of Computing Research Repository, Jul. 2015, 12 pages.

Daniele, et al., "A SOA-Based Platform-Specific Framework for Context-Aware Mobile Applications", In Proceedings of Second International Workshop on Enterprise Interoperabilit, Oct. 13, 2009, pp. 25-37.

"Non Final Office Action Issued in U.S. Appl. No. 15/263,685", dated Sep. 17, 2018, 15 Pages.

Mitchell, et al., "Experience With a Learning Personal Assistant", In Magazine of Communications of the ACM, vol. 37, Issue 7, Jul. 1994, 19 Pages.

"International Search Report and Written Opinion Issued in PCT Application No. PCT/US2017/023937", dated May 15, 2017, 12 Pages.

(56) References Cited

OTHER PUBLICATIONS

"International Search Report and Written Opinion Issued in PCT Application No. PCT/US2017/023940", dated May 15, 2017, 11 Pages.
"Non Final Office Action Issued in U.S. Appl. No. 15/263,609", dated Jun. 4, 2019, 44 Pages.
"Final Office Action Issued in U.S Appl. No. 15/263,685", dated May 15, 2019, 18 Pages.
"Final Office Action Issued in U.S. Appl. No. 15/263,609", dated Dec. 4, 2019, 57 Pages.
"Non Final Office Action Issued in U.S. Appl. No. 15/263,685", dated Jan. 9, 2020, 14 Pages.
"Final Office Action Issued in U.S. Appl. No. 15/263,685", dated Aug. 6, 2020, 18 Pages.
"Non Final Office Action Issued in U.S. Appl. No. 15/263,609", dated Apr. 16, 2020, 49 Pages.
"Final Office Action Issued in U.S. Appl. No. 15/263,609", dated Nov. 9, 2020, 56 Pages.
"Non Final Office Action Issued in U.S. Appl. No. 15/263,685", dated Feb. 16, 2021, 21 Pages.

\* cited by examiner

EXTENSIBILITY FOR CONTEXT-AWARE DIGITAL PERSONAL ASSISTANT

CROSS-REFERENCE TO RELATED APPLICATION(S)

This application claims the benefit of U.S. Provisional Application No. 62/314,966, filed Mar. 29, 2016 and entitled "Extensibility for Context-Aware Digital Personal Assistant," the entirety of which is incorporated by reference herein.

BACKGROUND

It has become relatively common for devices, such as laptop computers, tablet computers, personal digital assistants (PDAs), and cell phones, to have digital personal assistant functionality. A digital personal assistant is a representation of an entity that interacts with a user of a device. For instance, the digital personal assistant may answer questions that are asked by the user or perform tasks based on instructions from the user. One example of a digital personal assistant is Siri®, which was initially developed by Siri, Inc. and has since been further developed and maintained by Apple Inc. Another example of a digital personal assistant is Cortana®, which is developed and maintained by Microsoft Corporation. Although a digital personal assistant typically is able to communicate with a user of a device, functionality of conventional digital personal assistants often is limited to reacting to specific requests from the user.

SUMMARY

Various approaches are described herein for, among other things, providing extensibility with regard to a context-aware digital personal assistant. A context-aware digital personal assistant is a digital personal assistant that is capable of being aware of context (e.g., context of a user). For instance, the context-aware digital personal assistant may determine the context based on any one or more suitable factors. Examples of such a factor include but are not limited to a location, voice signals, an interaction pattern, a scheduled event, a communication (e.g., call, voice mail, email, text message, short message service (SMS) message, and/or social update), network information, a device on which the digital personal assistant is used, an application and/or service that is connected to the device, and one or more people with whom a user interacts.

In a first example approach, a description of a capability of a target (e.g., a software target) is received. Examples of a target include but are not limited to an application (e.g., a software application), a service, a bot, and a web site (e.g., network service or cloud service). A bot may be referred to as a software robot, a Web crawler, or a Web spider. A digital personal assistant is caused to perform operation(s) based at least in part on a context of a user. The operation(s) include notifying the user of the capability and/or implementing the capability on behalf of the user.

In a second example approach, a description of a capability of a target is received. Whether a digital personal assistant performs operation(s) that are configured to be triggered by first aspect(s) of a context of a user is controlled based at least in part on second aspect(s) of the context of the user. The operation(s) include notifying the user of the capability and/or implementing the capability on behalf of the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
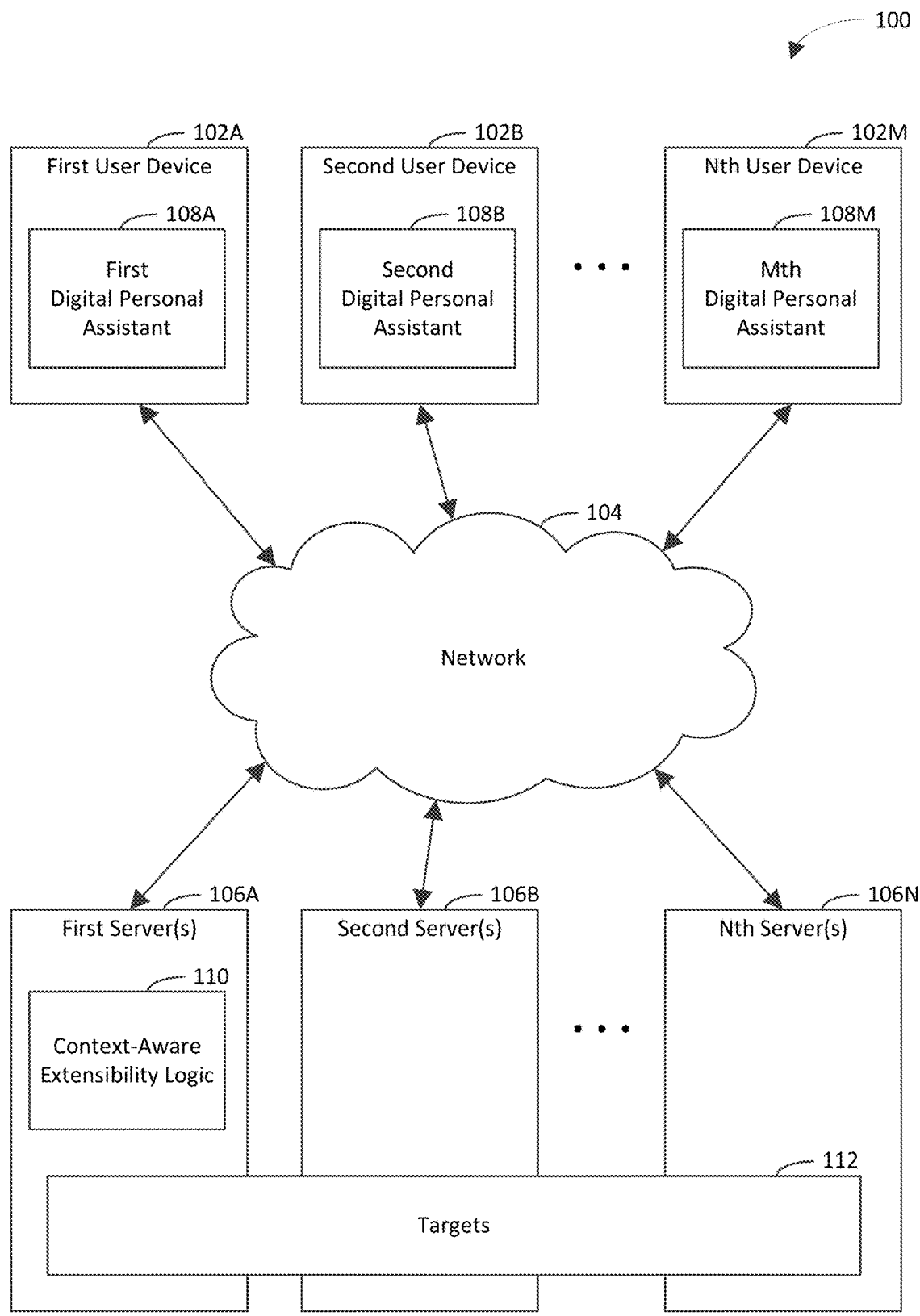
FIG. 1 is a block diagram of an example context-aware extensibility system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of providing extensibility with regard to a context-aware digital personal assistant. A context-aware digital personal assistant is a digital personal assistant that is capable of being aware of context (e.g., context of a user). For instance, the context-aware digital personal assistant may determine the context based on any one or more suitable factors. Examples of such a factor include but are not limited to a location, voice signals, an interaction pattern, a scheduled event, a communication (e.g., telephone call, call via a software application (e.g., Skype®, developed and distributed originally by Skype Technologies S.A.R.L. and subsequently by Microsoft Corporation), voice mail, email, text message, short message service (SMS) message, and/or social update, network information, a device on which the digital personal assistant is used, an application and/or service that is connected to the device, and one or more people with whom a user interacts.

The example embodiments may be capable of providing a digital personal assistant that learns a context of a user and provides capabilities of targets and/or notifications thereof (e.g., at an appropriate time instance) based on the context of the user. Examples of a target include but are not limited to an application (e.g., a software application), a service, a bot, and a website (e.g., network service or cloud service). Examples of an application include but are not limited to Uber™ which is developed and distributed by Uber Technologies, Inc., Twitter® which is developed and distributed by Twitter, Inc., and Snapchat® which is developed and distributed by Snapchat, Inc. Examples of a service include but are not limited to Bing® which is developed and maintained by Microsoft Corporation, Google® which is developed and maintained by Google Inc., and Yahoo! ® which is developed and maintained by Yahoo! Inc. A bot may be referred to as a software robot, a Web crawler, or a Web spider. Example embodiments may be capable of controlling whether the digital personal assistant provides the capabilities and/or notifications based at least in part on additional aspects of the context of the user. For instance, a determination may be made whether to honor a rule that indicates that the capabilities and/or notifications are to be provided based at least in part on the additional aspects of the context of the user.

Some example embodiments are directed to contextual delegation. Contextual delegation is automatic execution of task(s) in response to a specified context. For instance, the execution of the task(s) may be triggered by the specified context. Some example embodiments utilize further analysis of a user's context to determine whether the task(s) are to be executed in response to detection of the specified context. The example embodiments described herein are directed to any suitable environment, including but not limited to an enterprise environment and a consumer environment.

Some example embodiments are described with reference to a particular kind of target (e.g., an application or a service) for illustrative purposes. It should be noted that such descriptions are not intended to be limiting. It will be recognized that each of the example embodiments described herein is applicable to any suitable kind of target(s) and any suitable number of target(s).

Example techniques described herein have a variety of benefits as compared to conventional techniques for providing functionality of a digital personal assistant. For instance, the example techniques may simplify a process for implementing capabilities of targets, such as applications, services, bots, and websites. The example techniques may reduce an amount of time and/or resources (e.g., processor, memory, network bandwidth) that are consumed to implement such capabilities. The example embodiments may increase efficiency of a computing device that is used to implement one or more capabilities of a target. The example techniques may increase user efficiency (e.g., by reducing a number of steps that a user takes to implement one or more capabilities of a target). For instance, the example techniques described herein may reduce (e.g., eliminate) a need for a user to manually implement such capabilities.

FIG. 1 is a block diagram of an example context-aware extensibility system 100 in accordance with an embodiment. Generally speaking, context-aware extensibility system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, context-aware extensibility system 100 provides extensibility with regard to a context-aware digital personal assistant. For instance, the users may have mundane tasks that they would like to complete. Those tasks may be based on specified conditions (e.g., every time I have a meeting over lunch, I need to order food). The users might not always remember to perform the tasks, the tasks may be tedious and/or boring, etc. Accordingly, the users may desire to delegate the tasks to someone else if possible. Context-aware extensibility logic 110 may infer the context of a user and which actions are relevant to the specified conditions. When the conditions are satisfied, context-aware extensibility logic 110 may cause the digital personal assistant to complete one or more of the tasks on behalf of the user and/or to notify the user of a capability of a target that is capable of doing so. Context-aware extensibility logic 110 may cause the digital personal assistant to enable the user to create an instruction to perform the task(s) automatically from the second time on.

Detail regarding techniques for providing extensibility with regard to a context-aware digital personal assistant is provided in the following discussion.

As shown in FIG. 1, context-aware extensibility system 100 includes a plurality of user devices 102A-102M, a network 104, and a plurality of servers 106A-106N. Communication among user devices 102A-102M and servers 106A-106N is carried out over network 104 using well-known network communication protocols. Network 104 may be a wide-area network (e.g., the Internet), a local area network (LAN), another type of network, or a combination thereof.

User devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User devices 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, user devices 102A-102M are capable of accessing domains (e.g., Web sites) hosted by servers 106A-

106N, so that user devices 102A-102M may access information that is available via the domains. Such domain may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, or the like. It will be recognized that any one or more user systems 102A-102M may communicate with any one or more servers 106A-106N.

User devices 102A-102M are shown to include respective digital personal assistants 108A-108M. Digital personal assistants 108A-108M are representations of respective entities that interact with users of user devices 102A-102M. Each of the digital personal assistants 108A-108M may be configured (e.g., controlled) to notify user(s) of the respective user device about a capability of a target and/or to implement the capability on behalf of the user(s) based on (e.g., based at least in part on) a context of the user(s). For instance, each of the digital personal assistants 108A-108M may be configured to selectively notify the user(s) of the respective user device about the capability and/or to selectively implement the capability on behalf of the user(s) depending on whether the context of the user(s) satisfies one or more designated criteria. Accordingly, first digital personal assistant 108A may be configured to notify first user(s) of first user device 102A about a capability of a first target and/or to implement the capability on behalf of the first user(s) based on a context of the first user(s). Second digital personal assistant 108B may be configured to notify second user(s) of second user device 102B about a capability of a second target, which may be same as or different from the first target, and/or implement the capability on behalf of the second user(s) based on a context of the second user(s), and so on.

Examples of a criterion that may be satisfied for selectively notifying a user and/or selectively implementing a capability on behalf of the user include but are not limited to the user being at or within a designated proximity of a location, the user performing a designated action (e.g., waking up, leaving home, arriving at work, leaving work, arriving home, making dinner plans), communication of the user (e.g., verbal and/or written statement(s) of the user and/or person(s) with whom the user speaks) including designated information, an interaction pattern of the user and/or other users who share a common attribute with the user (e.g., with software or device(s)) having a designated attribute, an event of the user being scheduled to occur within a designated period of time, a textual message (e.g., email, text message, short message service (SMS) message, and/or social update) from or to the user including designated information, the user using a designated network, a device on which the digital personal assistant is used having a designated attribute, an application and/or service that is connected to the device having a designated attribute, and one or more people with whom a user interacts having a designated attribute.

Servers 106A-106N are processing systems that are capable of communicating with user devices 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of context-aware extensibility system 100.

First server(s) 106A is shown to include context-aware extensibility logic 110 for illustrative purposes. Context-aware extensibility logic 110 is configured to implement digital personal assistants 108A-108M. For example, context-aware extensibility logic 110 may implement any one or more of digital personal assistants 108A-108M to notify users of capabilities of targets and/or to implement the capabilities on behalf of the users.

Some example functionality of context-aware extensibility logic 110 will now be described with reference to first digital personal assistant 108A for purposes of illustration and is not intended to be limiting. It will be recognized that the functionality of context-aware extensibility logic 110 described herein is applicable to any suitable digital personal assistant (e.g., any one or more of digital personal assistants 108A-108M).

In a first example, context-aware extensibility logic 110 receives a description of a capability of a target. Context-aware extensibility logic 110 causes first digital personal assistant 108A to perform operation(s) based at least in part on a context of a user (e.g., a user of first user device 102A). The operation(s) include notifying the user of the capability and/or implementing the capability on behalf of the user.

In a second example, context-aware extensibility logic 110 receives a description of a capability of a target. Context-aware extensibility logic 110 causes digital personal assistant 108A to control whether first digital personal assistant 108A performs operation(s) that are configured to be triggered by first aspect(s) of a context of a user (e.g., a user of first user device 102A) based at least in part on second aspect(s) of the context of the user. The operation(s) include notifying the user of the capability and/or implementing the capability on behalf of the user.

Targets 112 are shown to be distributed across servers 106A-106N for illustrative purposes and are not intended to be limiting. It will be recognized that targets 112 may be included among (e.g., hosted by) any one or more of servers 106A-106N and/or any one or more of user devices 102A-102M.

Any of the digital personal assistants described herein may be a context-aware digital personal assistant, though the scope of the example embodiments is not limited in this respect. A context-aware digital personal assistant is a digital personal assistant that is capable of being aware of context (e.g., context of a user). For instance, the context-aware digital personal assistant may determine the context based on any one or more suitable factors. Examples of such a factor include but are not limited to a location, voice signals, an interaction pattern, a scheduled event, a communication (e.g., call, voicemail, email, text message, short message service (SMS) message, and/or social update), network information, a device on which the digital personal assistant is used, an application and/or service that is connected to the device, and one or more people with whom a user interacts.

It should be noted that as context-aware extensibility logic 110 gathers information about a user over time, the relevancy of the target capabilities that are presented to the user and/or that are implemented on behalf of the user may be greater than the relevancy of the capabilities that are previously presented to the user and/or that are previously implemented on behalf of the user. For instance, context-aware extensibility logic 110 may develop a model of the user or a group to which the user belongs. Context-aware extensibility logic 110 may develop and/or refine the model using online learning, for example.

Context-aware extensibility logic 110 may be implemented in various ways to provide extensibility with regard to a context-aware digital personal assistant, including being implemented in hardware, software, firmware, or any combination thereof. For example, context-aware extensibility logic 110 may be implemented as computer program code configured to be executed in one or more processors. In another example, context-aware extensibility logic 110 may be implemented as hardware logic/electrical circuitry. For instance, context-aware extensibility logic 110 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Context-aware extensibility logic 110 is shown to be incorporated in first server(s) 106A for illustrative purposes and is not intended to be limiting. It will be recognized that context-aware extensibility logic 110 (or any portion(s) thereof) may be incorporated in any one or more of the user systems 102A-102M. For example, client-side aspects of context-aware extensibility logic 110 may be incorporated in one or more of the user systems 102A-102M, and server-side aspects of context-aware extensibility logic 110 may be incorporated in first server(s) 106A. In another example, context-aware extensibility logic 110 may be distributed among the user systems 102A-102M. In yet another example, context-aware extensibility logic 110 may be incorporated in a single one of the user systems 102A-102M. In another example, context-aware extensibility logic 110 may be distributed among the server(s) 106A-106N. In still another example, context-aware extensibility logic 110 may be incorporated in a single one of the server(s) 106A-106N.

In some example embodiments, user(s) may interact with a digital personal assistant via context-aware extensibility logic 110 using voice commands, gesture commands, touch commands, and/or hover commands. For example, any one or more of the user devices 102A-102M may have a microphone that is configured to detect voice commands. In another example, any one or more of the user devices 102A-102M may have a camera that is configured to detect gesture commands. In yet another example, any one or more of the user devices 102A-102M may have a touch screen that is configured to detect touch commands and/or hover commands. A hover command may include a hover gesture. A hover gesture can occur without a user physically touching the touch screen. Instead, the user's hand or portion thereof (e.g., one or more fingers) can be positioned at a spaced distance above the touch screen. The touch screen can detect that the user's hand (or portion thereof) is proximate the touch screen, such as through capacitive sensing. Additionally, hand movement and/or finger movement can be detected while the hand and/or finger(s) are hovering to expand the existing options for gesture input. Context-aware extensibility logic 110 may determine the context of the user based at least in part on any of such voice, gesture, touch, and/or hover interactions.

Example techniques for providing extensibility with regard to a context-aware digital personal assistant are discussed in greater detail below with reference to FIGS. 2-6.

Figure 2:
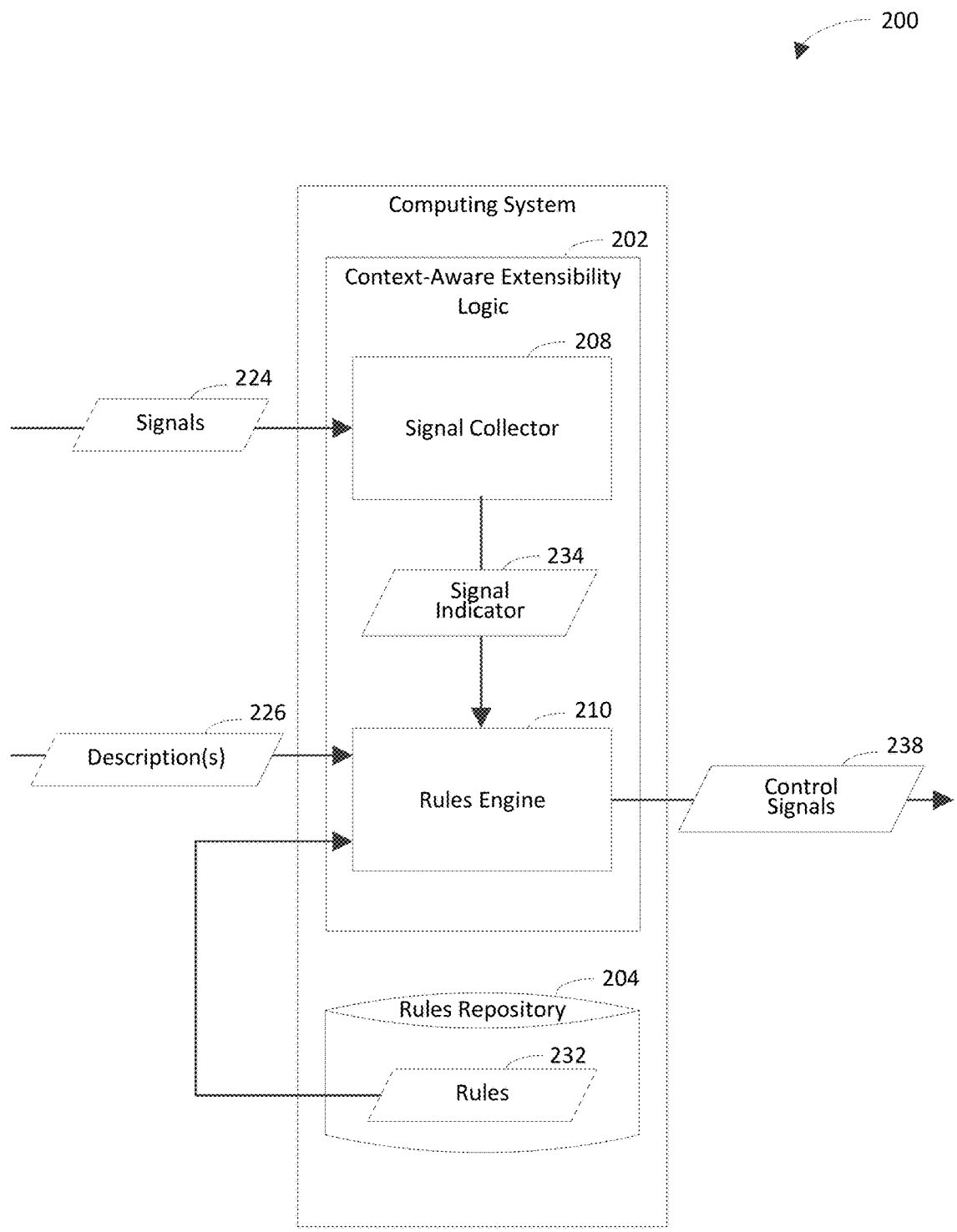
FIGS. 2 and 6 are block diagrams of example computing systems in accordance with embodiments.

FIG. 2 is a block diagram of an example computing system 200 in accordance with an embodiment. Computing system 200 may include one or more of user systems 102A-102M, one or more of server(s) 106A-106N, or any combination thereof, though the scope of the example embodiments is not limited in this respect. Computing system 200 includes context-aware extensibility logic 202, which is an example of context-aware extensibility logic 110, according to an embodiment. As shown in FIG. 2, computing system 200 further includes a rules repository 204.

Context-aware extensibility logic 202 includes a signal collector 208 and a rules engine 210. Signal collector 208 receives (e.g., retrieves, collects) signals 224 from various sources. Examples of a source include but are not limited to the cloud, a computing device (e.g., computing device 200 or other computing device), an inferred signal (e.g., based on one or more signals 224), an application, a user of computing system 200, and another user (e.g., a third-party). A connected band may have a heart rate sensor, which may serve as a signal generator. Examples of a signal include but are not limited to a traffic condition, a weather condition, a time, a location (e.g., a location of the user of computing device 200, another user, or an object) or change thereof, a user waking up, a user leaving home or work, a user arriving at home or work, a calendar entry of a user, receipt of a communication (e.g., a call or message), a device (e.g., computing device 200) being unlocked, and insurance or a subscription of a user needing renewal. Signal collector 208 may generate a signal indicator 234 to provide information regarding one or more of the signals 224. For example, one or more of the signals 224 may indicate a context of the user. In accordance with this example, signal collector 208 may generate the signal indicator 234 to specify the context of the user.

Signal collector 208 may infer (e.g., compute) one or more signals from the signals 224. Signal collector 208 may generate the signal indicator 234 to indicate (e.g., specify) the one or more inferred signals. Examples of an inferred signal include but are not limited to a user leaving his/her house, the user waking up, and the user about to be late for a meeting. For instance, signal collector 208 may read messages that the user receives from third parties to obtain inferences. For example, if a user has booked a restaurant reservation through an application, such as OpenTable®, and receives an email confirmation, the email confirmation may result in an inference to which new actions can be attached by rules engine 210. For instance, signal collector 208 may draw conclusions based on the email confirmation. Accordingly, signal collector 208 may indicate the inference in the signal indicator 234. Signals from a third-party may include but are not limited to a sale on Amazon® for a particular dress, an insurance company notifying the user that the user's insurance is about to expire, etc.

Rules engine 210 receives description(s) 226, which describe one or more capabilities of target(s); rules 232, which are stored in rules repository 204; and the signal indicator 234, which is generated by signal collector 208. Each of the rules 232 may specify condition(s) and an action that is to be performed when the condition(s) are satisfied. For example, the condition(s) may indicate a reference context of the user. Rules engine 210 may cross-reference the rules 232 and the signal indicator 234 to determine whether the condition(s) specified by each of the rules 232 are satisfied (e.g., to determine whether a context of the user and the reference context are same). When the condition(s) specified by a rule are satisfied, rules engine 210 generates control signals 238 to cause a digital personal assistant to notify the user of a capability of a target that is capable of performing the action specified by the rule and/or to implement the capability to perform the action on behalf of the user.

Rules engine 210 may be capable of implicitly or explicitly discovering capabilities of targets and associated action(s) that may be performed to implement capabilities of targets. With regard to explicit discovery, a developer of a target, the user, or another person may explicitly inform rules engine 210 about the capabilities of a target (including actions and/or parameters associated with the capabilities). For instance, such person may register the capabilities of the target with rules engine 210 via a website, a programming environment, or other suitable portal, which may enable rules engine 210 to know which capabilities are available for implementation. For example, a developer may say to the digital personal assistant, "My application can do X, and in order to do X, I need these five pieces of data. I think the best time to offer my application is when the user is on his way to work." In accordance with this example, rules engine 210 may analyze the developer's statements to determine the capabilities of the application and the rules for performing actions to implement the capabilities. In another example, the user may inform rules engine 210 (e.g., via the digital personal assistant) how to link up insights, capabilities (e.g., actions that are capable of implementing the capabilities), and parameters.

A developer of a target may be capable of restricting to whom the capabilities of the target are advertised, though the scope of the example embodiments is not limited in this respect.

Implicit discovery may involve gathering sufficient information from source(s) to determine (e.g., infer) that a target is capable of a designated capability. For example, rules engine 210 may implicitly discover all the capabilities that a target offers via deep linking and selectively implement the capabilities as operations or activities. This functionality may be described as being similar to a web crawler, except that rules engine 210 would look at the target's own declaration of its capabilities and attempt to figure out what the capabilities are, what they mean, etc. Once rules engine 210 determines the capabilities of the target, rules engine 210 may cause the digital personal assistant to selectively offer those capabilities depending on the context of the user (e.g., offer the capabilities in the right context). In another example, rules engine 210 may infer which tasks a specific user needs to perform. It will be recognized that rules engine 210 may include a discovery platform, a ranking mechanism, etc.

In one example implementation, a rule may specify that a text message is to be sent to the user's family when the user leaves work. One or more of the signals 224 may indicate that the user is leaving work or has left work. Rules engine 210 may cross-reference those signal(s) with the rule to determine that the condition(s) specified by the rule (i.e., the user leaves work in this example) are satisfied. Accordingly, rules engine 210 may automatically cause the digital personal assistant to send a text message to the user's family (e.g., using instant messaging (IM), a short message service (SMS), or a third-party service) to inform the user's family that the user is leaving work or has left work.

In another example implementation, a rule may specify that food is to be ordered from a designated restaurant when the user has a meeting that is scheduled to occur during lunchtime. Rules engine 210 may analyze the signals 224 to discover an entry on the user's calendar, indicating that the user has a meeting at noon today. Rules engine 210 may automatically order food from the designated restaurant to be delivered to the user's workplace (e.g., by a specified time, such as 11:45 am today) based on the user having the meeting at noon today.

Rules engine 210 may use inferred signals to cause the digital personal assistant to perform various operations, such as making movie reservations, ordering event tickets, making restaurant reservations, etc. Rules engine 210 may cause the digital personal assistant to send a reminder around the time that an event is scheduled to occur. For instance, rules engine 210 may cause the digital personal assistant to ask what kind of transportation is needed to get to the event. Upon receiving a response from the user, rules engine 210 may cause the digital personal assistant to make a reservation for the kind of transportation that is identified in the user's response.

Rules engine 210 may be aware of user preferences, such as the operations that the user prefers when designated conditions are satisfied. Examples of such an operation include but are not limited to providing a notification to the user, completing an action without input or interference from user, and completing the action and then notifying the user. Rules engine 210 may utilize user preferences (whether explicit or inferred) to enable the digital personal assistant to perform different actions for different users. For instance, the actions may not constitute a global set that applies to all users; rather, each user may have her own set of actions that she prefers.

Rules engine 210 may cause the digital personal assistant to execute action(s) under guidance of the user. For example, the user may say, "Go do X." In another example, rules engine 210 may cause the digital personal assistant to say, "I can go do X right now," and the user may say, "Yes." In this example, the user is involved in the decision-making process. In yet another example, rules engine 210 may have seen the user perform a task a number of times (e.g., once or twice), and rules engine 210 may cause the digital personal assistant to ask, "Do you want me to do this every time?" In accordance with this example, the user may say "Yes." This is an example of full delegation. For instance, full delegation may occur when performance of an action has left the user's consciousness as a job or task. Accordingly, the user need not necessarily remember that an action is due six months in the future or whenever it is next due. Rules engine 210 may configure the digital personal assistant to automatically perform the action in the future (e.g., electronically pay a bill). In an aspect of this example, rules engine 210 may cause the digital personal assistant to ask, "Do you want me to do this next time," rather than every time. In accordance with this aspect, the user may say, "Yes." This is an example of partial delegation.

Rules repository 204 is a store that stores the rules 232. Rules repository 204 may be any suitable type of store. One type of store is a database. For instance, rules repository 204 may be a relational database, an entity-relationship database, an object database, an object relational database, an extensible markup language (XML) database, etc.

The rules 232 may provide a mapping between conditions and possible actions (e.g., implementation of capabilities of one or more targets). In one example, a rule may specify a condition that a person has a meeting over lunch. The rule may specify an action of re-scheduling the meeting or ordering food for the meeting. Accordingly, the rule may map the condition of the user having the meeting over lunch and the action of re-scheduling the meeting or ordering food for the meeting.

The rules 232 may be created in any of a variety of ways, including but not limited to explicitly by the user, implicitly based on the user's past patterns, learning from other users' behavior, and editorially (e.g., by a system, such as computing system 200).

Following is a more detailed discussion of some ways in which rules may be created. In a first example, the user or a developer may explicitly inform the digital personal assistant about the targets and/or the capabilities of the targets. For instance, a developer may tell the digital personal assistant, "My application, service, bot, or website can perform some action (e.g., pay a bill), and here is when I think you should offer the action. Here's the data that I would like to have in order to be able to execute that action (e.g., bill due date, account number, amount to pay). Here is how you send me that data."

In one aspect, a developer may use a portal on a website or a visual design environment (e.g., Visual Studio®) to register the capabilities of a target against insights (e.g., context). The developer may tell the digital personal assistant actions to be performed on each type of operating system (e.g., how to call the actions), parameters (e.g., the kinds of data that are needed), and how to map the parameters into the target. The digital personal assistant may forward such information to rules engine 210 for processing.

In another aspect, a schematized form can be used. As long as a developer can generate a schema and upload it, rules engine 210 can use it. So, rather than registering the capabilities via a portal, a developer may generate the form and send it to rules engine 210 (e.g., via the digital personal assistant).

In yet another aspect, code may be written to call application programming interfaces (APIs) to register the capabilities.

In still another aspect, the developer may mark up (e.g., in an equivalent to Visual Studio®) a manifest that explicitly defines the actions that rules engine 210 is to perform in order to implement the capabilities. Accordingly, a person may generate an application manifest to include information, such as contexts that are relevant to implementation of the capabilities, actions that are to be called, and a mapping of parameters associated with the capabilities. Such functionality enables the developer to explicitly inform rules engine 210 that the developer wants the target to be accessible to the digital personal assistant. The manifest may have a defined structure, though the scope of the example embodiments is not limited in this respect.

In yet another aspect, the user may create the linkage between the context and the activities (e.g., capabilities). For instance, a user may say or type, "When I get home, turn on the lights." It will be recognized that a developer may create the action that is specified by the user (i.e., turn on the lights in this example). Moreover, the insight may already exist. This aspect is provided to show that the linkage between a trigger and an action may be created by a user.

In another example, rules may be implicitly created based on the user's past patterns. For instance, rules engine 210 may use a machine learning technique or other methodology to learn about actions that a target is capable of accomplishing. Through a combination of human and machine learning techniques, rules engine 210 may learn capabilities of websites and which links will lead to those websites, for example. For instance, Bing® may know about the ability of OpenTable® to reserve tables. Anytime rules engine 210 identifies a restaurant that OpenTable® knows about, and a person searches for that restaurant, rules engine 210 may cause the digital personal assistant to offer the action. Rules engine 210 may then take that kind of information and plug it into the context of the user.

In an aspect of this example, if rules engine 210 is aware that the user bought a movie ticket, the purchase of the movie ticket itself may be the insight to enable rules engine 210 to decide to cause the digital personal assistant to offer to book a table at the user's favorite restaurant in the area. Rules engine 210 may use the automatically learned information to do that. In accordance with this aspect, rules engine 210 may come up with the learned information on its own, and/or rules engine 210 may identify a trend indicating that every time the user goes to a movie, the user goes to a restaurant (or to that particular restaurant).

In another aspect, rules engine 210 may infer that the user orders a Greek salad when the user has a meeting over lunch. In accordance with this aspect, rules engine 210 may offer to order a Greek salad automatically for the user.

In yet another aspect, rules engine 210 may crawl manifests of targets to determine which targets have actions that are capable of being called externally. Rules engine 210 may cause the digital personal assistant to surface the actions, regardless whether the developers of those applications ever considered integrating the targets with the digital personal assistant. For instance, let's say there is a bill payment application (e.g., to pay the mortgage on a house), and the application happens to express an intent called "bill payment" in its application manifest. The developer may not be aware of the digital personal assistant and may not have integrated the application with the digital personal assistant's ability to pay bills. However, rules engine 210 may notice in any of a variety of ways (e.g., looking at what the application declares that it can do, judging when the contexts for that application are used, looking at the actions/results in that application, etc.) to determine that the application is capable of paying bills.

For instance, the user might say, "I need to pay my bill with the XYZ app." That might be sufficient for rules engine 210 to establish the action that the user has declared (i.e., to pay a bill) with what the user is trying to achieve. If rules engine 210 sees this enough, rules engine 210 may infer that the application is used to pay a designated type of bill, even though the application did not inform rules engine 210 of the capability. For instance, rules engine 210 may infer a pattern of paying the designated type of bill using the XYZ application based on the user's statements.

In yet another example, rules may be implicitly created based on other users' past patterns. For instance, rules engine 210 may infer that whenever the other users have a flight, those users usually take a taxi to the airport. Based on the inference from the other users, rules engine 210 may suggest reserving a taxi when rules engine 210 determines that the user has a flight.

Rules engine 210 may become aware of an action by looking at published services, which the application declares that it is capable of performing, and automatically integrating those services. For instance, if a user picks up a phone and says, "OK, integrate this app with the digital personal assistant," rules engine 210 may be capable of fulfilling that request.

Rules engine 210 may personalize operations, which may be based on explicit and/or inferred signals and the context of the user. Notifications of capabilities may be provided based on some rules, and capabilities may be implemented for other rules.

Rules engine 210 may cause the digital personal assistant to suggest an action that is capable of being performed using a capability of a target when the action is relevant to the user, when performance of the action makes sense, etc. For instance, rules engine 210 may cause the digital personal assistant to say, "I've noticed that you have an upcoming flight. Would you like me to cancel your meetings," "Would you like me to get you a ride to the airport," "Would you like me to freeze your newspaper subscription," etc. Rules engine 210 may cause the digital personal assistant to perform or offer to perform an action that is specified by a rule once or automatically each time the condition(s) specified by the rule are satisfied.

Example embodiments are capable of providing delegation of tasks based on context, automatic suggestion of capabilities, and interaction with the user to suggest enforcing a rule at an appropriate time for the user.

To further illustrate some functionality that the example techniques described herein are capable of providing, the example mentioned above in which the user's insurance is about to expire will be discussed in further detail. In one aspect, signal collector 208 or the user may receive an explicit notification (e.g., via email or text) from the insurance company regarding the upcoming expiration of the user's insurance. In another aspect, the user may implement a schedule that the insurance needs to be paid every six months. In yet another aspect, signal collector 208 or rules engine 210 may notice that the user pays the insurance bill through the digital personal assistant every six months. Signal collector 208 may utilize any of the aforementioned information to infer that an insurance payment needs to be provided to a designated insurance provider every six months and to infer an amount of the insurance payment.

Rules engine 210 may utilize any of the aforementioned information to cause the digital personal assistant to perform an operation, such as asking the user whether the user would like for the digital personal assistant to automatically pay the user's insurance going forward or automatically paying the insurance on behalf of the user (e.g., without first asking whether the user would like for the digital personal assistant to automatically pay the insurance).

Examples of operations that rules engine 210 may cause the digital personal assistant to perform include but are not limited to sending a message, cancelling a meeting, sending an out-of-office message, booking a flight, booking a hotel room, making a dinner reservation, getting a taxi, and playing music. For instance, rules engine 210 may cause the digital personal assistant to select a type of music based on the context of the user. For example, rules engine 210 may cause the digital personal assistant to choose soothing music before the user's bedtime, upbeat music while the user is working out at the gym, relaxing or upbeat music while the user is on the way home, etc. Accordingly, rules engine 210 may identify the action to be performed (i.e., play music in this example), the conditions for triggering the action, and the type of music to play.

Because rules engine 210 is capable of operating the digital personal assistant on different types of devices (e.g., Windows, Android, iOS), rules engine 210 may be able to know which device a user is working on (e.g., based on the signals 224) and send a notification to that device. Rules engine 210 may know not only what action to perform, but where to surface the types of actions that the user might want to take at a particular time.

For instance, if a user cannot send a text message from the user's personal computer, but the user is able to send a text message from the user's phone, rules engine 210 may know that the user's phone is capable of sending a text message and can execute the message from the phone rather than from the personal computer and failing. Different systems may have different operating system capabilities, and rules engine 210 may be capable of compensating for the different operating system capabilities, as well.

An application may not be installed on a device. If the application is a third-party application, rather than linking the user to the third-party application, rules engine 210 may know that the application is a third-party application and may therefore cause the digital personal assistant to link the user to the website of the third-party (rather than linking the user to the third-party application). It should be noted that action may not be offered if the digital personal assistant is not capable of executing the action on the device. Rules engine 210 may cause the digital personal assistant to offer an alternative solution. For instance, if the user is not able to place an order using Just Eat® on the user's Windows phone, rules engine 210 may cause the digital personal assistant to offer a different third-party from which the user may order food on the user's Windows phone. If the user does not have any food apps on the user's Windows phone, rules engine 210 may cause the digital personal assistant to say "I could order food for you if you download or load an application to do so."

Rules engine 210 may be capable of determining that an operation is not to be performed by the digital personal assistant even though the operation is scheduled to always be performed. For instance, rules engine 210 may determine that the operation is not to be performed because the context is not quite right for performing the operation. A trigger may be specified. The trigger may have a set of conditions attached to it. A general rule may be established that satisfaction of those conditions causes an action to take place. However, rules engine 210 may realize that the operation should not be performed and then choose not to cause the digital personal assistant to perform the operation.

Rules engine 210 may be aware of line-of-business (LOB) applications and services that are used in an enterprise (e.g., in a work environment). Such applications and services may be created by people in the enterprise, or the applications and services may be received from third parties (e.g., external vendors). The LOB applications and their capabilities may be described and exposed to rules engine 210. For instance, rules engine 210 may receive an indicator from any one or more of the applications and services, identifying the applications and services and specifying their capabilities. Depending of the context of the user (e.g., the behavior of the user and/or other signals), indications of the applications and services and tasks that are capable of being completed with the applications and services may be provided as cards, actions, or notifications.

The LOB applications and services and their content and workflows may be combined with the context of the user, preferences of the user, and/or enterprise policy to determine operation(s) to be performed by the digital personal assistant. For instance, the preferences may be provided manually by the user (e.g., via chat, notebook, speech, or other affordances). For example, an enterprise policy may specify that program managers who report to Manager X must compile task Y every Monday. This example is provided for illustrative purposes and is not intended to be limiting. Persons skilled in the relevant art(s) will recognize that the techniques described herein may utilize any suitable enterprise policy or no enterprise policy at all.

In one example, assume that there is a person in an enterprise, such as an information technology (IT) administrator, a developer, or somebody who builds enterprise applications and services in the enterprise. The person can build the applications and services and make them (and their capabilities) discoverable by rules engine 210. Rules engine 210 may then cause the digital personal assistant to perform operation(s), such as notify the user of one or more of the capabilities and/or implement one or more of the capabilities on behalf of the user. Some examples of a capability in an enterprise environment include but are not limited to generating an expense report, logging the user's miles, calling a corporate shuttle, rescheduling a meeting (e.g., with a CRM customer to a future date), changing a duration of a meeting, taking notes on a CRM system, changing the opportunity value of a CRM deal, and filing time away from the office. These capabilities may have been built within the enterprise (e.g., the corporation). Rules engine 210 may enable the digital personal assistant to connect to the capabilities and surface the capabilities to the user at the appropriate moment.

Rules engine 210 may enable the digital personal assistant to assist with workflows by tying multiple targets and workflows together. For example, rules engine 210 may recognize that when the user turns on machine X, application Y launches, switch Z is pressed, and designated safety instructions need to be reviewed. In another example, rules engine 210 may recognize that usually when supervisors perform task X, the supervisors also perform task Y or utilize control group Z.

A digital personal assistant may learn what is relevant in context of the LOB applications in any of a variety of ways. For example, the digital personal assistant may learn the user's physical location and may review workflows, applications, data used by other users in the organization (e.g., users who report to the same manager), and/or the time of the year to determine relevant information. Rules engine 210 may predict common questions the user may have and cause the digital personal assistant to surface actions to address such questions. Rules engine 210 may learn from what others did in the past in the same organization (e.g., when those persons joined the organization) and cause the digital personal assistant to expose such information.

Rules engine 210 is capable of causing the digital personal assistant to proactively perform operations (e.g., without prompting from the user). For instance, the digital personal assistant may say "Hey, it's kind of late. Do you want me to turn your lights on?"

Rules engine 210 learns about targets so that rules engine 210 may cause the digital personal assistant to surface appropriate capabilities of the targets at appropriate times. For instance, rules engine 210 may cause the digital personal assistant to assist the user with completing the right workflows. For example, if the user is at work and just finished a customer meeting, rules engine 210 may know that the user could complete details in a customer relationship management (CRM) system or that the user could close an opportunity that the user discussed with the customer. In accordance with this example, rules engine 210 may cause the digital personal assistant to open the CRM system and to recommend completion of the aforementioned tasks.

In another example, if the user comes home from a work-related trip, rules engine 210 may know that the user needs to log the miles that were driven for expense reimbursement purposes. In accordance with this example, rules engine 210 may recommend to the user that now is a good time to submit an expense report. Rules engine 210 may be aware of the various work-related tasks, and rules engine 210 may know when the user should perform the tasks. Rules engine 210 may cause the digital personal assistant to surface the work-related tasks at an appropriate moment (e.g., at the right moment). Rules engine 210 may cause the digital personal assistant to surface the tasks inline and/or to complete the tasks for the user. For instance, rules engine 210 may cause the digital personal assistant to proactively log the miles for the user in response to determining that the user just returned home.

Accordingly, rules engine 210 may cause the digital personal assistant to surface the expense report filing capability to the user. Rules engine 210 may use other signals (e.g., an indication that the user's calendar is open) to learn that in general the user is inclined to file an expense report as soon as possible when the user returns from a trip. Such signals may also indicate that the user usually files an expense report in the morning and/or when the user has some free time on the user's calendar. Rules engine 210 is capable of causing the digital personal assistant to present the expense report filing capability at an appropriate moment. In one example, rules engine 210 may cause the digital personal assistant to file the expense report for the user online. In another example, rules engine 210 may cause the digital personal assistant to assist by saying "I just need a couple of receipts, and I can file the expense report for you." In yet another example, rules engine 210 may cause the digital personal assistant to open the application so that the user can file the expense report herself. Rules engine 210 may cause the digital personal assistant to perform any one or more of the aforementioned operations and/or other operation(s). For instance, rules engine 210 may cause the digital personal assistant to file the expense report on behalf of the user. In one aspect of this example, rules engine 210 may cause the digital personal assistant to say, "I have all the receipts because you scanned them all in while you were on the trip, and I know everything is there. Do you want me to submit an expense report?" The user may say, "Sure, go ahead," and rules engine 210 may consequently cause the digital personal assistant to proceed with filing the expense report. In another aspect of this example, rules engine 210 may cause the digital personal assistant to proactively file the expense report and then say, "I just filed the expense report. Do you want to review it?"

Various levels of trust may be associated with a digital personal assistant. For example, rules engine 210 may cause the digital personal assistant to notify the user of a capability of an application so that the user may implement the capability. For instance, rules engine 210 may cause the digital personal assistant to ask the user to implement the capability. In another example, rules engine 210 may cause the digital personal assistant to ask the user whether the digital personal assistant should implement the capability on the user's behalf, and then implement the capability once the user approves. In yet another example, rules engine 210 may cause the digital personal assistant to implement the capability on the user's behalf, and then notify the user (e.g., ask whether the user wants to review).

Many targets may be available in the enterprise, and the user may not know that the user has access to the targets. Rules engine 210 is capable of causing the digital personal assistant to surface the targets at the right time by looking at triggers, including but not limited to times when the user typically performs a designated task, the user's calendar, when people in the user's company usually perform the designated task, company policy, and so on. For instance, a company policy may designate a deadline (e.g., task must be performed within 30 days). Rules engine 210 may be aware of such triggers, and rules engine 210 may cause the digital personal assistant to surface the corresponding capabilities at an appropriate moment. Rules engine 210 may be aware of the enterprise workflows and deadlines, what other people are doing, what the user usually does, etc. Rules engine 210 may learn from such signals, know all the targets that are available to the user, and surface the targets and their capabilities to the user (e.g., at the right moment).

Some capabilities of an application may be accessible to some users and not to other users. For example, rules engine 210 may know that a user does not have access to the human resources (HR) system of the user's employer. Rules engine 210 therefore may control the digital personal assistant to not show HR information and HR capabilities that can be implemented to the user because the user does not have access to those. In another example, a developer in a company may build an application for the company's use and then offer the application to other companies. For instance, the company may have a system that makes travel arrangements (e.g., travel bookings) for employees of the company, and the system also may be offered to enterprise customers. The enterprise customers may purchase access to the system to book travel and get receipts (e.g., meal and lodging receipts) through the system. The system may be implemented such that rules engine 210 is capable of understanding the capabilities of the system. Rules engine 210 may then cause the digital personal assistant to surface those capabilities at the right time. Accordingly, the applications need not necessarily be internal to a company. For instance, a developer in the company may share a target with another company (e.g., through a business-to-business relationship).

Once rules engine 210 learns a first action (e.g., that the user files expense reports), rules engine 210 may start to chain operations together (e.g., by inferring relationships between targets, tasks, etc.). For instance, rules engine 210 may determine that when the user files an expense report, the user should also perform another action (e.g., log the user's miles). Rules engine 210 may cause the digital personal assistant to say, "I just filed this expense report and logged your miles. Is that OK?"

The techniques described herein are applicable to the consumer environment, as well as the enterprise environment. For instance, rules engine 210 may cause the digital personal assistant to perform operations based on the context of the user in the consumer environment (e.g., call a taxi, schedule or cancel a meeting, order food, or make travel arrangements). The signals and triggers and the operations that are capable of being performed may be the same or different in the consumer environment, as compared to the enterprise environment.

Consumer embodiments may be tailored to individuals. The consumer embodiments may pertain to implementation of capabilities of consumer products with regard to consumers. In one example, John often may use Uber, and rules engine 210 may cause the digital personal assistant to request an Uber ride on behalf of John when rules engine 210 determines that John needs a ride.

Differences may exist between consumer embodiments and enterprise embodiment, though the scope of the example embodiments is not limited in this respect. For instance, in a consumer embodiment, a developer of a consumer application may make the application available to the world. Rules engine 210 may consider actions performed by other people in the user's area (e.g. neighborhood or city) for purposes of implementing the techniques described herein. In an enterprise embodiment, a developer within a company may develop an enterprise application for use by employees of the company or by a designated group (e.g., finance, marketing, or legal) of employees within the company. Rules engine 210 may be capable of learning information from a user's peers within the company. For instance, when a user begins a new job, that may be when the user is likely to need assistance (e.g., with filing expense reports and related documents). Rules engine 210 may know that others in the user's group perform tasks in a particular way or in accordance with a company policy.

Rules engine 210 may learn the triggers, policy, and conditions (e.g., appropriate time, day, and location (e.g., work vs. home)) to surface the applications and services. Rules engine 210 may cause the digital personal assistant to show the user certain tasks while the user is at work and other tasks when the user is at home. In an example, assume that a first user is in a finance group of a company, and the first user is therefore authorized to see finance information. Further assume that a second user is in an HR group of the company, and the second user is therefore authorized to see HR information. Some of the information may be shared, and some of the information may be restricted. For example, the second user (e.g., manager) may be more senior in the company than the first user (e.g., entry-level employee). The first user may not be able to access all of the information that is accessible to the second user based on the aforementioned difference in seniority.

The structure of a company may influence accessibility to information. For example, a company may not want to show CRM information to employees who build software. In accordance with this example, the company may want to show the people who build the software information about building software. Accordingly, rules engine 210 may enable the digital personal assistant to surface specific actions to specific people in a company (e.g., depending on what is interesting for those people and/or what the people are allowed to see and use for security purposes. In another example, finance information may be shown only to members of the finance group and C-level executives of the company, and HR information may be shown only to members of the HR group and managers of the company.

The ability of rules engine 210 to chain actions may be useful in an enterprise environment. For instance, if a user is performing task A, rules engine 210 may recognize that the user should also be performing tasks B and C because tasks A, B, and C are part of a workflow. Rules engine 210 may control the digital personal assistant to help with performing the workflow. In one example, rules engine 210 may chain actions and perform all of the actions for the user. In another example, the user may perform one action, and rules engine 210 may cause the digital personal assistant to perform the other actions for the user.

Security constraints may be different or the same between the enterprise and consumer embodiments. It may be beneficial for enterprise information to remain compartmentalized. For instance, rules engine 210 may be aware of security parameters (e.g., access restrictions for designated users).

Rules engine 210 may cause the digital personal assistant to serve pieces of information and functionality that are referred to as "cards." For instance, a card may be a block of content (e.g., a picture) or an action that is capable of being performed. Some pre-defined scenarios may be defined for cards. For example, rules engine 210 may be aware that a user has a flight. In accordance with this example, rules engine 210 may cause the digital personal assistant to show the user a card, which reads "I've identified the flight is coming up. Do you want me to track it?" If the user presses "Yes", rules engine 210 may cause the digital personal assistant to track the flight. Rules engine 210 then may show the user another card that lists the flight information, including a map, the departure gate, information indicating whether the flight is delayed, etc.

Other pre-defined scenarios may include but are not limited to package tracking, weather, news, stock quotes, etc. Third-party applications and services may surface cards. For instance, rules engine 210 may cause the digital personal assistant to say, "I have prepared your expense report. See details here," or "I have prepared your expense report. Do you want me to file it?" Rules engine 210 may cause the digital personal assistant to surface the statement as a card or a notification. If the user selects the notification, the user may complete a task or instruct the digital personal assistant to launch the user into the full experience (e.g., show the application to the user). A notification may be configured to communicate with a user (e.g., provide an alert that an event is to occur).

A CRM system may indicate a new lead for an account that the user is monitoring. This information may be provided to the user as a card that gives the user some options for actions that the user may perform. For instance, the user may follow-up with the account or contact some of the user's buddies. Rules engine 210 may cause the digital personal assistant to present the card to the user, give the user options, and/or show the flow through the system.

The user may have an upcoming meeting with a company associated with an account. The user may want the most current and thorough information available about the company leading up to the meeting. For instance, the company may have made a deal or changed an executive, and the user may benefit from knowing such information. Rules engine 210 may know that the user is meeting with the company next week and may therefore increase the amount of information about the company that is presented the user. Once the meeting has concluded, the user need not necessarily need to know the latest news about the company as urgently. Accordingly, rules engine 210 may then cause the digital personal assistant to provide information regarding the company in a summarized digest form.

Figure 3:
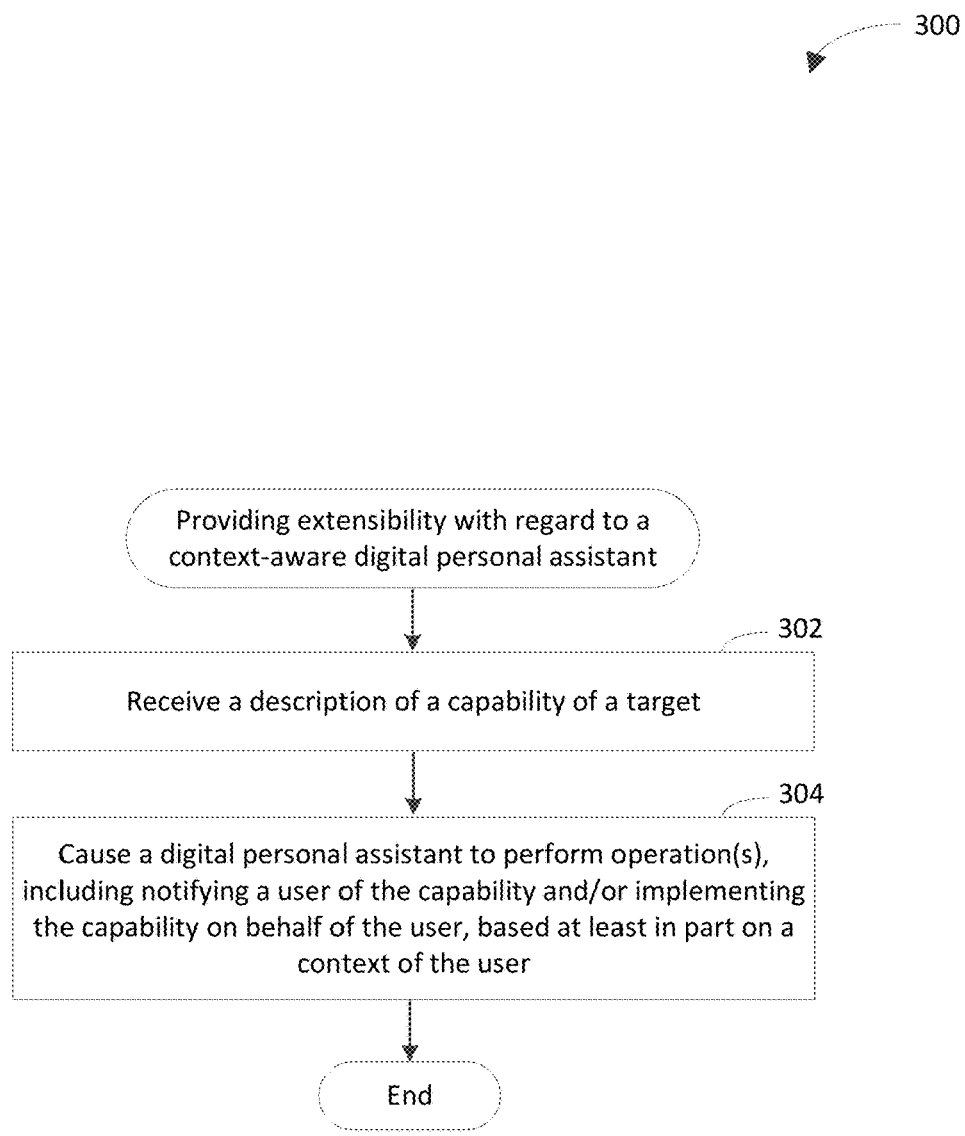
FIGS. 3-5 depict flowcharts of example methods for providing extensibility with regard to a context-aware digital personal assistant in accordance with embodiments.
Figure 4:
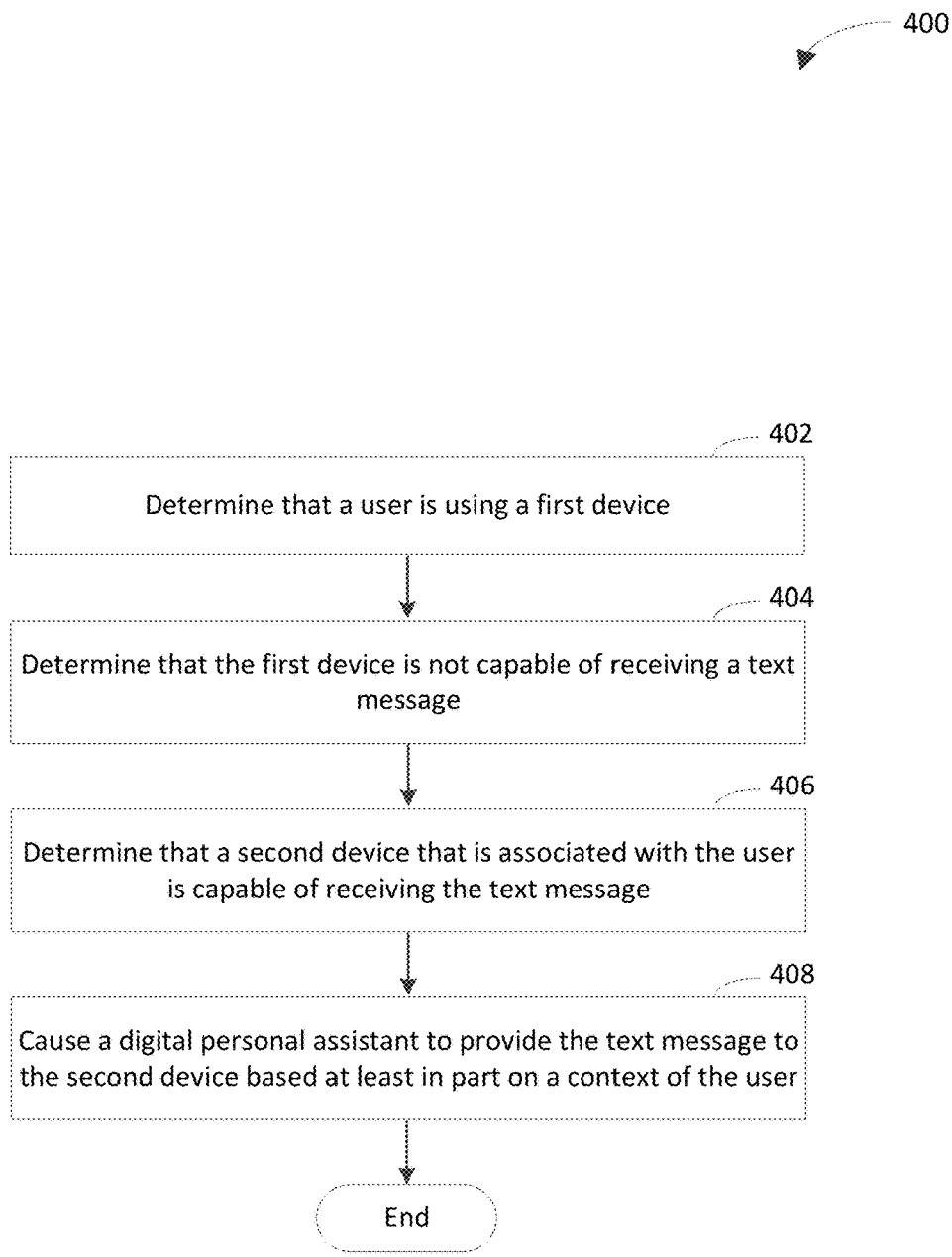
Figure 5:
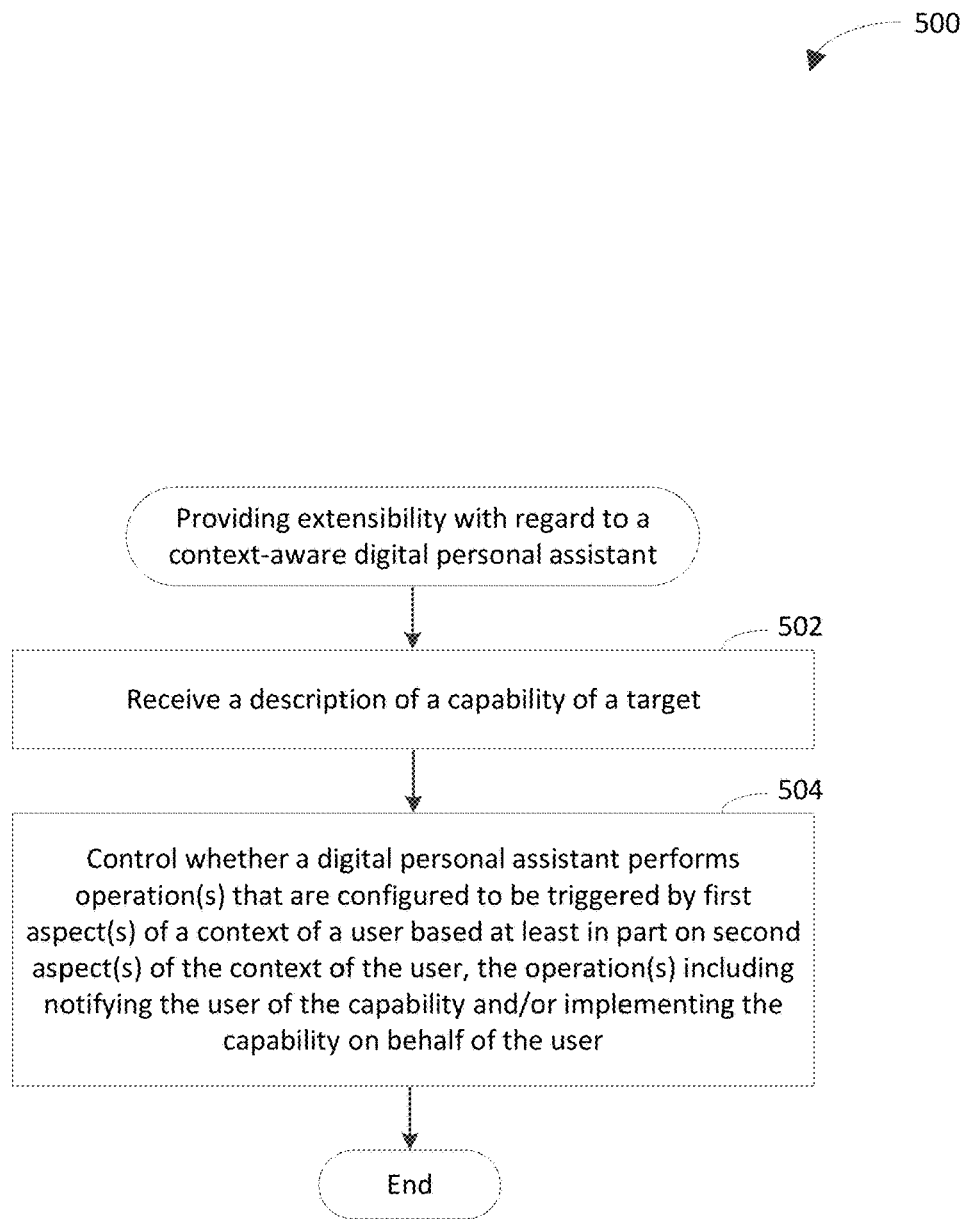
Figure 6:
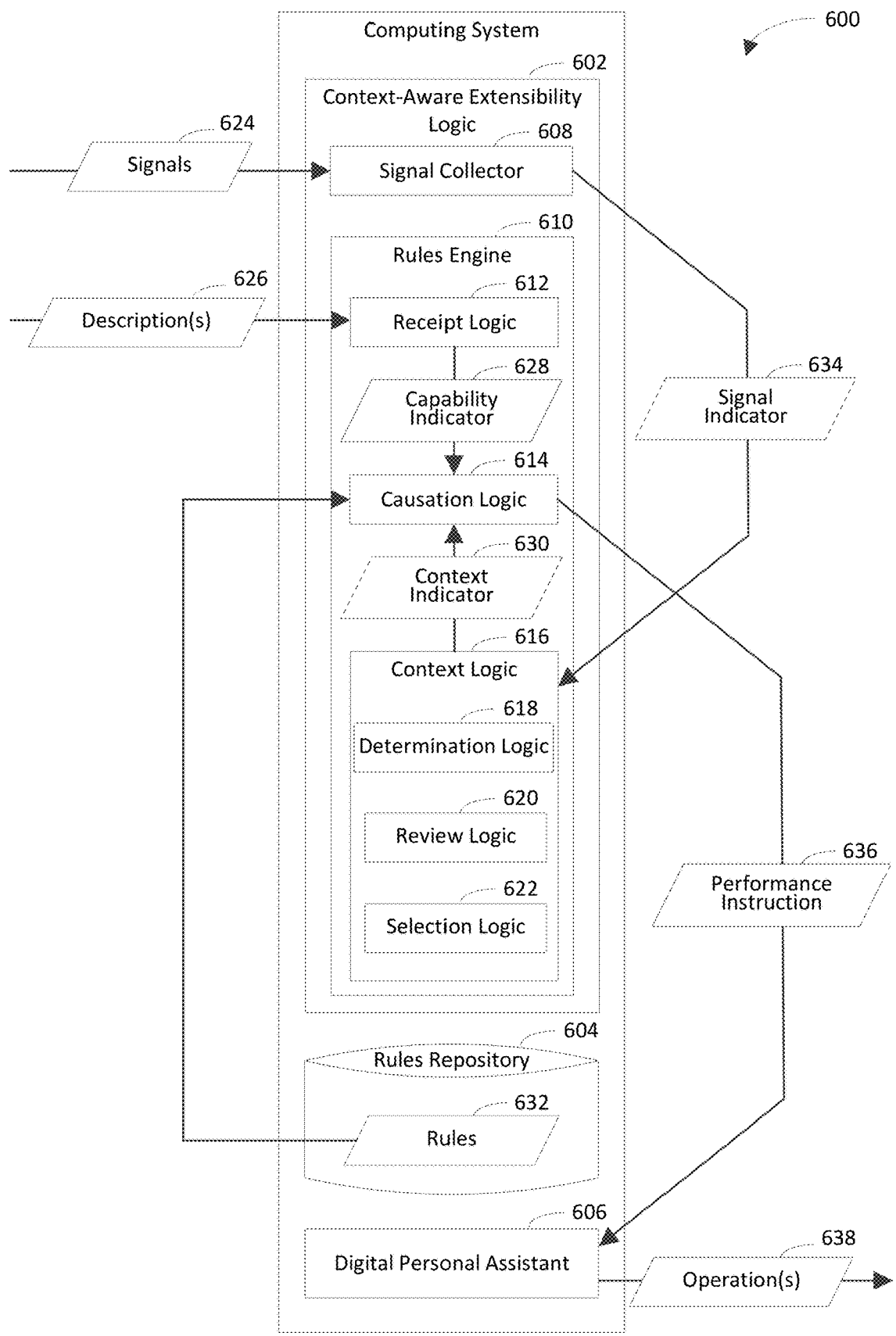

FIGS. 3-5 depict flowcharts 300, 400, and 500 of example methods for providing extensibility with regard to a context-aware digital personal assistant in accordance with embodiments. Flowcharts 300, 400, and 500 may be performed by context-aware extensibility logic 110 shown in FIG. 1, for example. For illustrative purposes, flowcharts 300, 400, and 500 are described with respect to computing system 600 shown in FIG. 6. Computing system 600 may include one or more of user systems 102A-102M, one or more of server(s) 106A-106N, or any combination thereof, though the scope of the example embodiments is not limited in this respect. Computing system 600 includes context-aware extensibility logic 602, which is an example of context-aware extensibility logic 110, according to an embodiment. As shown in FIG. 6, computing system 600 further includes a rules repository 604 and a digital personal assistant 606. Context-aware extensibility logic 602 includes a signal collector 608 and a rules engine 610. Rules engine 610 includes receipt logic 612, causation logic 614, and context logic 616. Context logic 616 includes determination logic 618, review logic 620, and selection logic 622. Further structural and operational embodiments will be apparent to persons skilled in the relevant art(s) based on the discussion regarding flowcharts 300, 400, and 500.

As shown in FIG. 3, the method of flowchart 300 begins at step 302. In step 302, a description of a capability of a target is received. For instance, the target may be an application, a service, a bot, or a website. In an example implementation, receipt logic 612 receives the description of the capability of the target. For instance, the description of the capability may be included in description(s) 626. In accordance with this implementation, receipt logic 612 may generate a capability indicator 628 to indicate the capability, which is described in the description(s) 626.

In an example embodiment, receiving the description at step 302 includes discovering the description of the capability of the target via deep linking of the target.

In another example embodiment, receiving the description at step 302 includes determining that a developer of the target registers the capability of the target with the digital personal assistant via a portal. For instance, the portal may be a website or a visual design environment.

In yet another example embodiment, receiving the description at step 302 includes calling application programming interface(s) to register the capability of the target with the digital personal assistant.

In still another example embodiment, receiving the description at step 302 includes receiving a schematized form from a developer of the target. In accordance with this embodiment, the schematized form describes the capability of the target.

At step 304, a digital personal assistant is caused (e.g., controlled) to perform operation(s), including notifying a user of the capability and/or implementing the capability on behalf of the user, based at least in part on a context of the user. For example, the digital personal assistant may be caused to perform the operation(s) in accordance with an explicit rule. In another example, the digital personal assistant may be caused to perform the operation(s) in accordance with an inferred rule. In accordance with this example, the inferred rule may be a rule that is not explicitly defined. In further accordance with this example, causation logic 614 may cause digital personal assistant 606 to perform the operation(s) 638 based at least in part on the inferred rule and further based at least in part on the context of the user. In an example implementation, causation logic 614 causes digital personal assistant 606 to perform operation(s) 638 based at least in part on the context of the user. For instance, causation logic 614 may control digital personal assistant 606 to cause digital personal assistant 606 to perform the operation(s) 638. In accordance with this implementation, the operation(s) 638 include notifying the user of the capability and/or implementing the capability on behalf of the user.

In an example embodiment, signal collector 608 receives signals 624 from source(s). One or more of the signals 624 relate to the context of the user. Signal collector 608 generates a signal indicator 634 based at least in part on the one or more of the signals 624. Signal indicator 624 includes information relating to the context of the user. In further accordance with this embodiment, context logic 616 determines the context of the user based at least in part on the signal indicator 634. For instance, context logic 616 may review the information relating to the context of the user that is included in the signal indicator 634 to determine the context of the user. For instance, context logic 616 may infer the context of the user from the information in the signal indicator 634, though the scope of the example embodiments is not limited in this respect. Context logic 616 generates a context indicator 630 to indicate the context of the user. In further accordance with this embodiment, rules repository 604 stores rules 632 that specify action(s) and condition(s) that trigger the action(s). In further accordance with this embodiment, causation logic 614 may determine the operation(s) 638 to be performed by digital personal assistant 606 based at least in part on the capability indicator 628, the context indicator 630, and the rules 632.

For example, causation logic 614 may review the capability indicator 628 to determine the capability of the target. Causation logic 614 may review the context indicator 630 to determine the context of the user. Causation logic 614 may review the rules 632 to determine the action(s) that are capable of being performed to implement the capability of the target and the condition(s) that trigger those action(s). Causation logic 614 may further determine whether the context of the user satisfies the condition(s). Causation logic 614 may cause digital personal assistant 606 to perform the operation(s) 638 in response to determining that the context of the user satisfies the condition(s) that trigger the action(s) that are capable of being performed to implement the capability of the target.

In accordance with this embodiment, causation logic 614 may generate a performance instruction 636 that instructs digital personal assistant to perform the operation(s). Causation logic 614 may provide the performance instruction 636 to digital personal assistant 606 to cause digital personal assistant to perform the operation(s) 638.

It will be recognized that rules repository 604 need not necessarily store the rule that that causation logic 614 uses to determine the action(s) that are capable of being performed to implement the capability of the target and the condition(s) that trigger those action(s). For instance, causation logic 614 may infer the rule (e.g., based at least in part on a history of the user and/or a history of other user(s)).

In one example, notifying the user of the capability includes notifying the user that the capability is available for selection by the user. In accordance with this example, selection of the capability by the user causes implementation of the capability. In another example, notifying the user of the capability includes notifying the user that the target has the capability. In yet another example, implementing the capability includes causing implementation of the capability to be initiated.

In an example embodiment, causing the digital personal assistant to perform the operation(s) at step 304 includes causing the digital personal assistant to provide a notification to the user based at least in part on the context of the user. For instance, the notification may be a notification message. In accordance with this embodiment, the notification indicates at least one action that the digital personal assistant is capable of performing to implement the capability on behalf of the user. For instance, the at least one action includes at least one yet-to-be-performed action. A yet-to-be-performed action is an action that has not yet been performed.

In an aspect of this embodiment, causing the digital personal assistant to perform the operation(s) at step 304 includes causing the digital personal assistant to provide a request to the user based at least in part on the context of the user. The request solicits instructions as to whether the digital personal assistant is to perform the at least one action to implement the capability on behalf of the user. For instance, the request may solicit instructions as to whether the digital personal assistant is to perform the at least one action once or automatically in lieu of providing the request in future.

In another example embodiment, causing the digital personal assistant to perform the operation(s) at step 304 includes causing the digital personal assistant to launch the target based at least in part on the context of the user to enable the user to implement the capability of the target (e.g., via interaction of the user with the target).

In yet another example embodiment, causing the digital personal assistant to perform the operation(s) at step 304 includes causing the digital personal assistant to implement the capability on behalf of the user based at least in part on the context of the user. For instance, the digital personal assistant may be caused to proactively implement the capability on behalf of the user (e.g., without being prompted by the user to implement the capability). In accordance with this embodiment, causing the digital personal assistant to perform the operation(s) at step 304 further includes causing the digital personal assistant to notify the user that the digital personal assistant implemented the capability on behalf of the user (e.g., in response to the capability being implemented on behalf of the user).

In still another example embodiment, causing the digital personal assistant to perform the operation(s) at step 304 includes causing the digital personal assistant to perform the operation(s) based at least in part on a history (e.g., behavioral trend) of the user and further based at least in part on the context of the user.

In an example embodiment, causing the digital personal assistant to perform the operation(s) at step 304 includes causing the digital personal assistant to perform the operation(s) based at least in part on the user waking up.

In yet another example embodiment, causing the digital personal assistant to perform the operation(s) at step 304 includes causing the digital personal assistant to perform the operation(s) based at least in part on the user leaving a location (e.g., a home of the user or a workplace of the user).

In still another example embodiment, receiving the description at step 302 includes receiving the description of a multiple capabilities of multiple targets. The capabilities include at least one capability for each of the targets. In accordance with this embodiment, causing the digital personal assistant to perform the operation(s) at step 304 includes, for each of the capabilities, causing the digital personal assistant to notify the user of the capability and/or implement the capability on behalf of the user based at least in part on the context of the user.

In some example embodiments, one or more steps 302 and/or 304 of flowchart 300 may not be performed. Moreover, steps in addition to or in lieu of steps 302 and/or 304 may be performed. For instance, in an example embodiment, the target is a line-of-business application that is used in an enterprise. In an aspect of this embodiment, causing the digital personal assistant to perform the operation(s) at step 304 includes causing the digital personal assistant to perform the operation(s) based at least in part on the user being employed by the enterprise and further based at least in part on a duration for which the user is employed by the enterprise being less than or equal to a threshold duration of time. In accordance with this aspect, the method of flowchart 300 may further include determining the duration for which the user is employed by the enterprise. In further accordance with this aspect, the method of flowchart 300 may further include comparing the duration to the threshold to determine whether the duration is less than or equal to the threshold.

In an example of this aspect, the method of flowchart 300 may further include determining that the operation(s) are performed with regard to specified user(s) when the specified user(s) are employed by the enterprise for respective duration(s) that are less than the threshold duration of time. In accordance with this example, causing the digital personal assistant to perform the operation(s) at step 304 includes causing the digital personal assistant to perform the operation(s) with regard to the user based at least in part on a determination that the operation(s) are performed with regard to the specified user(s) when the specified user(s) are employed by the enterprise for the respective duration(s) that are less than the threshold duration of time.

In another example embodiment, causing the digital personal assistant to perform the operation(s) at step 304 includes causing the digital personal assistant to perform the operation(s) based at least in part on the context of the user and further based at least in part on a history (e.g., behavioral trend) of other user(s) who are not the user.

In an aspect of this embodiment, the method of flowchart 300 further includes determining that the user and the other user(s) share at least one common (e.g., same) attribute. For example, the user and the other user(s) may live in a same city. In another example, an age of the user and an age of each of the other user(s) are include in a designated range of ages. In yet another example, the user and the other user(s) may be peers, have the same title at the company, have similar or same job duties, and/or have the same manager. In accordance with this aspect, causing the digital personal assistant to perform the operation(s) at step 304 includes causing the digital personal assistant to perform the operation(s) based at least in part on the context of the user, a determination that the user and the other user(s) share the at least one common attribute, and the history of the other user(s).

In yet another example embodiment, the target is a line-of-business application that is used in an enterprise. In an aspect of this embodiment, the method of flowchart 300 further includes determining that the operation(s) are performed with regard to specified user(s) when the specified user(s) are employed by the enterprise for respective duration(s) that are less than the threshold duration of time. For example, determination logic 618 may determine that the operation(s) are performed with regard to the specified user(s) when the specified user(s) are employed by the enterprise for the respective duration(s). In accordance with this example, determination logic 618 may make the determination based on (e.g., based at least in part on) the signal indicator 634 indicating that the operation(s) are performed with regard to the specified user(s) when the specified user(s) are employed by the enterprise for the respective duration(s). In accordance with this aspect, causing the digital personal assistant to perform the operation(s) at step 304 includes causing the digital personal assistant to perform the operation(s) with regard to the user based at least in part on a determination that the operation(s) are performed with regard to the specified user(s) when the specified user(s) are employed by the enterprise for the respective duration(s) that are less than the threshold duration of time.

In another aspect of this embodiment, the method of flowchart 300 further includes determining that the user is scheduled to meet with an entity at a specified time. For example, determination logic 618 may determine that the user is scheduled to meet with the entity at the specified time. In accordance with this example, determination logic 618 may make the determination based on the signal indicator 634 indicating that the user is scheduled to meet with the entity at the specified time. In accordance with this aspect, the method of flowchart 300 further includes determining whether a difference between the specified time and a current time is less than or equal to a threshold amount of time. For instance, determination logic 618 may make the determination. In further accordance with this aspect, causing the digital personal assistant to perform the operation(s) at step 304 includes causing the digital personal assistant to perform the operation(s) based at least in part on a determination that the difference between the specified time and the current time is less than or equal to the threshold amount of time. For instance, the description of the capability may indicate that the line-of-business application is capable of increasing an amount of data that is provided by the line-of-business application.

In yet another aspect of this embodiment, the method of flowchart 300 further includes determining that the user and other user(s) share at least one common attribute. For instance, determination logic 618 may make the determination. In accordance with this aspect, causing the digital personal assistant to perform the operation(s) at step 304 includes causing the digital personal assistant to perform the operation(s) based at least in part on the context of the user, a determination that the user and the other user(s) share the at least one common attribute, and a history of the other user(s). The user and the other user(s) may share at least one common attribute in any of a variety of ways, including but not limited to being co-workers in the enterprise, reporting to a common manager in the enterprise, having a same role in the enterprise, and being members of a same team in the enterprise.

In still another aspect of this embodiment, the method of flowchart 300 further includes determining that the line-of-business application is not accessible on a device of the user (e.g., a device that is currently being used by the user). For example, the line-of-business application may not be installed on the device. In another example, access to the line-of-business application may not be authorized on the device (whether or not the line-of-business application is installed on the device). In an example implementation, determination logic 618 determines that the line-of-business application is not accessible on the device.

In an example of this aspect, causing the digital personal assistant to perform the operation(s) at step 304 includes causing the digital personal assistant to provide a procedural workflow that identifies action(s) to be performed to cause the line-of-business application to be accessible on the device.

In another example of this aspect, causing the digital personal assistant to perform the operation(s) at step 304 includes causing the digital personal assistant to notify the user that a specified target that is different from the line-of-business application has the capability and/or implement the capability using the specified target on behalf of the user. For instance, the specified target may be a second line-of-business application (e.g., that is installed on the device).

In still another example embodiment, the method of flowchart 300 further includes determining that the user initiates performance of a first action. For instance, determination logic 618 may make the determination. In accordance with this embodiment, the method of flowchart 300 further includes reviewing historical information to infer that second action(s) are performed with the first action at historical time instance(s) at which the first action is performed. For example, review logic 620 may review the historical information. In accordance with this example, the signal indicator 634 may include the historical information. In accordance with this embodiment, causing the digital personal assistant to perform the operation(s) at step 304 includes causing the digital personal assistant to notify the user that the second action(s) have been performed with the first action in the past. The capability includes performance of the second action(s).

In another example embodiment, the method of flowchart 300 further includes inferring the context of the user from a communication of the user. For example, the communication may be a text communication (e.g., email, IM, SMS message, or social update). In another example, the communication may be a voice communication (e.g., during a phone conversation).

In yet another example embodiment, the target is an application. In an aspect of this embodiment, the method of flowchart 300 further includes determining that the application is not installed on a device of the user (e.g., a device that is being used by the user). For instance, determination logic 618 makes the determination.

In an example of this aspect, causing the digital personal assistant to perform the operation(s) at step 304 includes causing the digital personal assistant to provide a link to a website from which the application is capable of being downloaded to the device.

In another example of this aspect, causing the digital personal assistant to perform the operation(s) at step 304 includes causing the digital personal assistant to notify the user that a second target has the capability and/or implement the capability using the second target on behalf of the user. For instance, the second target may be a second application that is installed on the device.

In still another example embodiment, the description of the capability indicates that multiple targets have the capability. In accordance with this embodiment, the method of flowchart 300 further includes selecting the target from the multiple targets based on an inference from information regarding the user that the user prefers the target over the other targets to implement the capability. For instance, selection logic 622 may select the target from the multiple targets. In further accordance with this embodiment, causing the digital personal assistant to perform the operation(s) at step 304 includes causing the digital personal assistant to notify the user that the target has the capability and/or implement the capability on behalf of the user using the target in response to selecting the target from the multiple targets.

In yet another example embodiment, causing the digital personal assistant to perform the operation(s) at step 304 includes causing the digital personal assistant to provide a notification to the user based at least in part on the context of the user. The notification indicates that that the capability is available for selection by the user to cause implementation of the capability. In an aspect of this embodiment, the method of flowchart 300 further includes determining that the user is associated with at least a first device and a second device. For instance, determination logic 618 determines that the user is associated with at least the first device and the second device. In accordance with this aspect, the method of flowchart 300 further includes determining that the user is using the first device. For instance, determination logic 618 may determine that the user is using the first device. In further accordance with this aspect, causing the digital personal assistant to provide the notification includes causing the digital personal assistant to provide the notification at the first device and not at the second device based at least in part on determining that the user is using the first device.

In another aspect of this embodiment, the notification may be a text message. In accordance with this aspect, the steps of flowchart 400 shown in FIG. 4 are performed in lieu of step 304. As shown in FIG. 4, the method of flowchart 400 begins at step 402. In step 402, a determination is made that a user is using a first device. For instance, determination logic 618 may determine that the user is using the first device.

At step 404, a determination is made that the first device is not capable of receiving a text message. For instance, determination logic 618 may determine that the first device is not capable of receiving the text message.

At step 406, a determination is made that a second device that is associated with the user is capable of receiving the text message. For instance, determination logic 618 may determine that the second device is capable of receiving the text message.

At step 408, a digital personal assistant is caused to provide the text message to the second device based at least in part on a context of the user. For example, causation logic 614 may cause digital personal assistant 606 to provide the text message to the second device. In accordance with this example, causation logic 614 may cause digital personal assistant 606 to provide the text message to the second device in response to (e.g., based at least in part on) determining that the first device is not capable of receiving the text message at step 404 and further in response to determining that the second device is capable of receiving the text message at step 406.

As shown in FIG. 5, the method of flowchart 500 begins at step 502. In step 502, a description of a capability of a target is received. In an example implementation, receipt logic 612 receives the description of the capability of the target. For instance, the description of the capability may be included in description(s) 626. In accordance with this implementation, receipt logic 612 may generate a capability indicator 628 to indicate the capability, which is described in the description(s) 626.

In an example embodiment, the target is a line-of-business application that is used in an enterprise.

In another example embodiment, receiving the description at step 502 includes discovering the description of the capability of the target via deep linking of the target.

In yet another example embodiment, receiving the description at step 502 includes determining that a developer of the target registers the capability of the target with the digital personal assistant via a portal (e.g., a website or a visual design environment).

In still another example embodiment, receiving the description at step 502 includes calling application programming interface(s) to register the capability of the target with the digital personal assistant.

In yet another example embodiment, receiving the description at step 502 includes receiving a schematized form from a developer of the target. The schematized form describes the capability of the target.

At step 504, whether a digital personal assistant performs operation(s) that are configured to be triggered by first aspect(s) of a context of a user is controlled based at least in part on second aspect(s) of the context of the user. The operation(s) include notifying the user of the capability and/or implementing the capability on behalf of the user. In an example implementation, causation logic 614 controls whether digital personal assistant 606 performs operation(s) 638 that are configured to be triggered by the first aspect(s) of the context of the user based at least in part on the second aspect(s) of the context of the user.

For example, causation logic 614 may review the capability indicator 628 to determine the capability of the target. Causation logic 614 may review the context indicator 630 to determine the context of the user. Causation logic 614 may review the rules 632 to determine the action(s) that are capable of being performed to implement the capability of the target and designated condition(s) that trigger those action(s). Causation logic 614 may further determine whether the context of the user satisfies the designated condition(s). For instance, causation logic 614 may determine whether the context of the user includes the first aspect(s). Causation logic 614 may be configured to cause digital personal assistant 606 to perform the operation(s) 638 in response to a determination that the context of the user satisfies the designated condition(s) that trigger the action(s) and further in response to the context including the second aspect(s). Accordingly, causation logic 614 may control digital personal assistant 606 to perform the operation(s) 638 in response to a determination that the context of the user satisfies the designated condition(s) that trigger the action(s) and further in response to the context including the second aspect(s). Causation logic 614 may be configured to not cause digital personal assistant 606 to perform the operation(s) 638 in response to a determination that the context does not include the second aspect(s), regardless whether the context of the user satisfies the designated condition(s) that trigger the action(s). Accordingly, causation logic 614 may control digital personal assistant 606 to not perform the operation(s) 638 in response to a determination that the context does not include the second aspect(s).

In an aspect of this example, causation logic 614 may be configured to generate a performance instruction 636 that instructs digital personal assistant to perform the operation(s) in response to a determination that the context of the user satisfies the designated condition(s) that trigger the action(s) and further in response to the context including the second aspect(s). In accordance with this aspect, causation logic 614 may provide the performance instruction 636 to digital personal assistant 606 to cause digital personal assistant to perform the operation(s) 638.

In another aspect of this example, causation logic 614 may be configured to not generate the performance instruction 636 and/or not provide the performance instruction 636 to digital personal assistant 606 in response to a determination that the context does not include the second aspect(s).

In an example embodiment, the operation(s) include providing a notification (e.g., notification message) to the user. The notification indicates at least one action (e.g., yet-to-be-performed action) that the digital personal assistant is capable of performing to implement the capability on behalf of the user.

In an aspect of this embodiment, the operation(s) include providing a request to the user. The request solicits instructions as to whether the digital personal assistant is to perform the at least one action to implement the capability on behalf of the user. For example, the request may ask whether the digital personal assistant is authorized to perform the at least one action on behalf of the user the next time the context of the user includes the first aspect(s) and the second aspect(s). In another example, the request may ask whether the digital personal assistant is authorized to perform the at least one action on behalf of the user every time the context of the user includes the first aspect(s) and the second aspect(s).

In another example embodiment, the operation(s) include launching the target to enable the user to implement the capability of the target. For instance, launching the target may enable the user to interact with the target to implement the capability.

In yet another example embodiment, the operation(s) include implementing the capability on behalf of the user and notifying the user that the digital personal assistant implemented the capability on behalf of the user. For example, the capability may be proactively implemented on behalf of the user (e.g., without a need for prompting by the user). In another example, the user may be notified in response to the capability being implemented on behalf of the user.

In still another example embodiment, controlling whether the digital personal assistant performs the operation(s) at step 504 includes controlling whether the digital personal assistant performs the operation(s) based at least in part on the first aspect(s) of the context of the user, the second aspect(s) of the context of the user, and a history of the user. For instance, the history may include a historical trend of behavior exhibited by the user.

In another example embodiment, controlling whether the digital personal assistant performs the operation(s) at step 504 includes controlling whether the digital personal assistant performs the operation(s) based at least in part on the first aspect(s) of the context of the user, the second aspect(s) of the context of the user, and a history of other user(s) who are not the user. For instance, the history may include a historical trend of behavior exhibited by the other user(s).

In yet another example embodiment, controlling whether the digital personal assistant performs the operation(s) at step 504 includes controlling whether the digital personal assistant performs the operation(s) that are configured to be triggered based at least in part on the user waking up.

In still another example embodiment, controlling whether the digital personal assistant performs the operation(s) at step 504 includes controlling whether the digital personal assistant performs the operation(s) that are configured to be triggered based at least in part on the user entering a location and/or leaving the location. For instance, the location may be a city, a state, a country, a location of another person, a restaurant, a theater, a park, a theme park, a workplace, or a school.

In yet another example embodiment, receiving the description at step 504 includes receiving the description of multiple capabilities of multiple targets. The capabilities include at least one capability for each of the targets. In accordance with this embodiment, the operation(s) include, for each capability, notifying the user of the capability and/or implementing the capability on behalf of the user based at least in part on the context of the user.

In some example embodiments, one or more steps 502 and/or 504 of flowchart 500 may not be performed. Moreover, steps in addition to or in lieu of steps 502 and/or 504 may be performed. For instance, in an example embodiment, the method of flowchart 500 further includes determining that the user is not authorized to access the capability of the target based at least in part on the at least one second aspect of the context of the user. For instance, determination logic 618 may determine that the user is not authorized to access the capability of the target. In accordance with this embodiment, controlling whether the digital personal assistant performs the operation(s) at step 504 includes controlling the digital personal assistant to not perform the operation(s) based at least in part on the user not being authorized to access the capability of the target.

In another example embodiment, the method of flowchart 500 further includes determining that the user and the other user(s) share at least one common (e.g., same) attribute. For instance, determination logic 618 may make the determination. In accordance with this embodiment, controlling whether the digital personal assistant performs the operation(s) at step 504 includes controlling whether the digital personal assistant performs the operation(s) based at least in part on the first aspect(s) of the context of the user, the second aspect(s) of the context of the user, a determination that the user and the other user(s) share the at least one common attribute, and the history of the other user(s). For example, the user and the other user(s) may share a common attribute by living in a same neighborhood, city, county, state, or country. In another example, the user and the other user(s) may share a common attribute by having a common demographic attribute (e.g., age, gender, education level, income level, marital status, occupation, or religion).

In yet another example embodiment, the method of flowchart 500 further includes determining that the user initiates performance of a first action. For instance, determination logic 618 may make the determination. In accordance with this embodiment, the method of flowchart 500 further includes reviewing historical information to infer that second action(s) are performed with the first action at one or more historical time instances at which the first action is performed. For instance, review logic 620 may review the historical information. In further accordance with this embodiment, the operation(s) include notifying the user that the second action(s) have been performed with the first action in the past. The capability includes performance of the second action(s).

In still another example embodiment, the method of flowchart 500 further includes inferring the first aspect of the context of the user and/or the second aspect of the context of the user from a communication of the user. For instance, the communication may be a text communication or a voice communication. In an example implementation, determination logic 618 infers the first aspect of the context of the user and/or the second aspect of the context of the user from the communication.

In yet another example embodiment, the target is an application. In accordance with this embodiment, the method of flowchart 500 further includes determining that the application is not installed on a device of the user. For instance, the device may be a device via which the digital personal assistant is currently interacting with the user, a device that the user is currently using, or a device with which the user has interacted within a threshold period of time prior to the current time. In an example implementation, determination logic 618 makes the determination.

In an aspect of this embodiment, the operation(s) include providing a link to a website from which the application is capable of being downloaded to the device. In another aspect of this embodiment, the operation(s) include notifying the user that a second target has the capability and/or implementing the capability using the second target on behalf of the user. For instance, the second target may be a second application that is installed on the device.

In still another example embodiment, the description indicates that multiple targets have the capability. In accordance with this embodiment, the method of flowchart 500 further includes selecting the target from the multiple targets based on an inference from information regarding the user that the user prefers the target over the other targets to implement the capability. For instance, selection logic 622 may select the target from the multiple targets based on the inference.

It will be recognized that computing system 600 may not include one or more of context-aware extensibility logic 602, rules repository 604, digital personal assistant 606, signal collector 608, rules engine 610, receipt logic 612, causation logic 614, context logic 616, determination logic 618, review logic 620, and/or selection logic 622. Furthermore, computing system 600 may include components in addition to or in lieu of context-aware extensibility logic 602, rules repository 604, digital personal assistant 606, signal collector 608, rules engine 610, receipt logic 612, causation logic 614, context logic 616, determination logic 618, review logic 620, and/or selection logic 622.

Any one or more of context-aware extensibility logic 110, context-aware extensibility logic 202, signal collector 208, rules engine 210, context-aware extensibility logic 602, signal collector 608, rules engine 610, receipt logic 612, causation logic 614, context logic 616, determination logic 618, review logic 620, selection logic 622, flowchart 300, flowchart 400, and/or flowchart 500 may be implemented in hardware, software, firmware, or any combination thereof.

For example, any one or more of context-aware extensibility logic 110, context-aware extensibility logic 202, signal collector 208, rules engine 210, context-aware extensibility logic 602, signal collector 608, rules engine 610, receipt logic 612, causation logic 614, context logic 616, determination logic 618, review logic 620, selection logic 622, flowchart 300, flowchart 400, and/or flowchart 500 may be implemented, at least in part, as computer program code configured to be executed in one or more processors.

In another example, any one or more of context-aware extensibility logic 110, context-aware extensibility logic 202, signal collector 208, rules engine 210, context-aware extensibility logic 602, signal collector 608, rules engine 610, receipt logic 612, causation logic 614, context logic 616, determination logic 618, review logic 620, selection logic 622, flowchart 300, flowchart 400, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

A first example system to provide extensibility with regard to a context-aware digital personal assistant comprises receipt logic configured to receive a description of a capability of a target. The first example system further comprises causation logic configured to cause a digital personal assistant to perform one or more operations, including at least one of notifying a user of the capability or implementing the capability on behalf of the user, in accordance with an inferred rule based at least in part on a context of the user.

In a first aspect of the first example system, the causation logic is configured to cause the digital personal assistant to provide a notification to the user based at least in part on the context of the user. The notification indicates at least one action that the digital personal assistant is capable of performing to implement the capability on behalf of the user.

In a second aspect of the first example system, the causation logic is configured to cause the digital personal assistant to provide the notification as a request to the user based at least in part on the context of the user. The request solicits instructions as to whether the digital personal assistant is to perform the at least one action to implement the capability on behalf of the user. The second aspect of the first example system may be implemented in combination with the first aspect of the first example system, though the example embodiments are not limited in this respect.

In a third aspect of the first example system, the causation logic is configured to cause the digital personal assistant to launch the target based at least in part on the context of the user to enable the user to implement the capability of the target. The third aspect of the first example system may be implemented in combination with the first and/or second aspect of the first example system, though the example embodiments are not limited in this respect.

In a fourth aspect of the first example system, the causation logic is configured to cause the digital personal assistant to implement the capability on behalf of the user based at least in part on the context of the user. In accordance with the fourth aspect, the causation logic is configured to cause the digital personal assistant to notify the user that the digital personal assistant implemented the capability on behalf of the user. The fourth aspect of the first example system may be implemented in combination with the first, second, and/or third aspect of the first example system, though the example embodiments are not limited in this respect.

In a fifth aspect of the first example system, the causation logic is configured to cause the digital personal assistant to perform the one or more operations based at least in part on a history of the user and further based at least in part on the context of the user. The fifth aspect of the first example system may be implemented in combination with the first, second, third, and/or fourth aspect of the first example system, though the example embodiments are not limited in this respect.

In a sixth aspect of the first example system, the causation logic is configured to cause the digital personal assistant to perform the one or more operations based at least in part on the context of the user and further based at least in part on a history of one or more other users who are not the user. The sixth aspect of the first example system may be implemented in combination with the first, second, third, fourth, and/or fifth aspect of the first example system, though the example embodiments are not limited in this respect.

In an example of the sixth aspect of the first example system, the first example system further comprises determination logic configured to determine whether the user and the one or more other users share at least one common attribute. In accordance with this example, the causation logic is configured to cause the digital personal assistant to perform the one or more operations based at least in part on the context of the user, a determination that the user and the one or more other users share the at least one common attribute, and the history of the one or more other users.

In a seventh aspect of the first example system, the first example system further comprises determination logic configured to determine whether the user initiates performance of a first action. In accordance with the seventh aspect, the first example system further comprises review logic configured to review historical information to infer that one or more second actions are performed with the first action at one or more historical time instances at which the first action is performed. In further accordance with the seventh aspect, the causation logic is configured to cause the digital personal assistant to notify the user that the one or more second actions have been performed with the first action in the past. The capability includes performance of the one or more second actions. The seventh aspect of the first example system may be implemented in combination with the first, second, third, fourth, fifth, and/or sixth aspect of the first example system, though the example embodiments are not limited in this respect.

In an eighth aspect of the first example system, the first example system further comprises determination logic configured to infer the context of the user from a communication of the user. The eighth aspect of the first example system may be implemented in combination with the first, second, third, fourth, fifth, sixth, and/or seventh aspect of the first example system, though the example embodiments are not limited in this respect.

In a ninth aspect of the first example system, the receipt logic is configured to discover the description of the capability of the target via deep linking of the target. The ninth aspect of the first example system may be implemented in combination with the first, second, third, fourth, fifth, sixth, seventh, and/or eighth aspect of the first example system, though the example embodiments are not limited in this respect.

In a tenth aspect of the first example system, the receipt logic is configured to determine that a developer of the target registers the capability of the target with the digital personal assistant via a portal. The tenth aspect of the first example system may be implemented in combination with the first, second, third, fourth, fifth, sixth, seventh, eighth, and/or ninth aspect of the first example system, though the example embodiments are not limited in this respect.

In an eleventh aspect of the first example system, the receipt logic is configured to call one or more application programming interfaces to register the capability of the target with the digital personal assistant. The eleventh aspect of the first example system may be implemented in combination with the first, second, third, fourth, fifth, sixth, seventh, eighth, ninth, and/or tenth aspect of the first example system, though the example embodiments are not limited in this respect.

In a twelfth aspect of the first example system, the receipt logic is configured to review a schematized form from a developer of the target to determine the description of the capability of the target. The twelfth aspect of the first example system may be implemented in combination with the first, second, third, fourth, fifth, sixth, seventh, eighth, ninth, tenth, and/or eleventh aspect of the first example system, though the example embodiments are not limited in this respect.

In a thirteenth aspect of the first example system, the description indicates that a plurality of targets have the capability. In accordance with the thirteenth aspect, the first example system further comprises selection logic configured to select the target from the plurality of targets based on an inference from information regarding the user that the user prefers the target over the other targets to implement the capability. In further accordance with the thirteenth aspect, the causation logic is configured to cause the digital personal assistant to at least one of notify the user that the target has the capability or implement the capability on behalf of the user using the target in response to selection of the target from the plurality of targets. The thirteenth aspect of the first example system may be implemented in combination with the first, second, third, fourth, fifth, sixth, seventh, eighth, ninth, tenth, eleventh, and/or twelfth aspect of the first example system, though the example embodiments are not limited in this respect.

A second example system to provide extensibility with regard to a context-aware digital personal assistant in an enterprise environment comprises receipt logic configured to receive a description of a capability of a line-of-business application that is used in an enterprise. The second example system further comprises causation logic configured to cause a digital personal assistant to perform one or more operations, including at least one of notifying a user of the capability of the line-of-business application or implementing the capability of the line-of-business application on behalf of the user, based at least in part on a context of the user.

In a first aspect of the second example system, the causation logic is configured to cause the digital personal assistant to perform the one or more operations based at least in part on the user being employed by the enterprise and further based at least in part on a duration for which the user is employed by the enterprise being less than or equal to a threshold duration of time.

In an example of the first aspect of the second example system, the second example system further comprises determination logic configured to determine that the one or more operations are performed with regard to one or more specified users when the one or more specified users are employed by the enterprise for one or more respective durations that are less than the threshold duration of time. In accordance with this example, the causation logic is configured to cause the digital personal assistant to perform the one or more operations with regard to the user based at least in part on a determination that the one or more operations are performed with regard to the one or more specified users when the one or more specified users are employed by the enterprise for the one or more respective durations that are less than the threshold duration of time.

In a second aspect of the second example system, the second example system further comprises determination logic configured to determine that the user is scheduled to meet with an entity at a specified time. In accordance with the second aspect, the determination logic is further configured to determine whether a difference between the specified time and a current time is less than or equal to a threshold amount of time. In further accordance with the second aspect, the causation logic is configured to cause the digital personal assistant to perform the one or more operations based at least in part on a determination that the difference between the specified time and the current time is less than or equal to the threshold amount of time. The second aspect of the second example system may be implemented in combination with the first aspect of the second example system, though the example embodiments are not limited in this respect.

In a third aspect of the second example system, the second example system further comprises determination logic configured to determine whether the user and one or more other users share at least one common attribute. In accordance with the third aspect, the causation logic is configured to cause the digital personal assistant to perform the one or more operations based at least in part on the context of the user, a determination that the user and the one or more other users share the at least one common attribute, and a history of the one or more other users. The third aspect of the second example system may be implemented in combination with the first and/or second aspect of the second example system, though the example embodiments are not limited in this respect.

In a fourth aspect of the second example system, the second example system further comprises determination logic configured to determine whether the line-of-business application is accessible on a device of the user. In accordance with the fourth aspect, the causation logic is configured to cause the digital personal assistant to provide a procedural workflow that identifies one or more actions to be performed to cause the line-of-business application to be accessible on the device based at least in part on a determination that the line-of-business application is not accessible on the device. The fourth aspect of the second example system may be implemented in combination with the first, second, and/or third aspect of the second example system, though the example embodiments are not limited in this respect.

In a fifth aspect of the second example system, the second example system further comprises determination logic configured to determine whether the line-of-business application is accessible on a device of the user. In accordance with the fifth aspect, the causation logic is configured to cause the digital personal assistant to at least one of notify the user that a specified target that is different from the line-of-business application has the capability or implement the capability using the specified target on behalf of the user, based at least in part on a determination that the line-of-business application is not accessible on the device. The fifth aspect of the second example system may be implemented in combination with the first, second, third, and/or fourth aspect of the second example system, though the example embodiments are not limited in this respect.

In a first example method of providing extensibility with regard to a context-aware digital personal assistant, a description of a capability of a target is received. A digital personal assistant is caused to provide a notification to a user based at least in part on a context of the user. The notification indicates that that the capability is available for selection by the user to cause implementation of the capability.

In a first aspect of the first example method, the notification is a text message. In accordance with the first aspect, the first example method further comprises determining that the user is using a first device. In further accordance with the first aspect, the first example method further comprises determining that the first device is not capable of receiving the text message. In further accordance with the first aspect, the first example method further comprises determining that a second device that is associated with the user is capable of receiving the text message. In further accordance with the first aspect, causing the digital personal assistant to provide the notification comprises causing the digital personal assistant to provide the text message to the second device in response to determining that the first device is not capable of receiving the text message and further in response to determining that the second device is capable of receiving the text message.

In a second aspect of the first example method, the first example method further comprises determining that the user is associated with at least a first device and a second device. In accordance with the second aspect, the first example method further comprises determining that the user is using the first device. In further accordance with the second aspect, causing the digital personal assistant to provide the notification comprises causing the digital personal assistant to provide the notification at the first device and not at the second device based at least in part on determining that the user is using the first device. The second aspect of the first example method may be implemented in combination with the first aspect of the first example method, though the example embodiments are not limited in this respect.

In a third aspect of the first example method, causing the digital personal assistant to provide the notification comprises causing the digital personal assistant to provide the notification based at least in part on the user waking up. The third aspect of the first example method may be implemented in combination with the first and/or second aspect of the first example method, though the example embodiments are not limited in this respect.

In a fourth aspect of the first example method, causing the digital personal assistant to provide the notification comprises causing the digital personal assistant to provide the notification based at least in part on the user leaving a location. The fourth aspect of the first example method may be implemented in combination with the first, second, and/or third aspect of the first example method, though the example embodiments are not limited in this respect.

In a fifth aspect of the first example method, the target is an application. In accordance with the fifth aspect, the first example method further comprises determining that the application is not installed on a device of the user. In further accordance with the fifth aspect, causing the digital personal assistant to provide the notification comprises causing the digital personal assistant to provide a link to a website from which the application is capable of being downloaded to the device. The fifth aspect of the first example method may be implemented in combination with the first, second, third, and/or fourth aspect of the first example method, though the example embodiments are not limited in this respect.

In a sixth aspect of the first example method, the target is an application. In accordance with the sixth aspect, the first example method further comprises determining that the application is not installed on a device of the user. In further accordance with the sixth aspect, causing the digital personal assistant to provide the notification comprises causing the digital personal assistant to notify the user that a second target has the capability. The sixth aspect of the first example method may be implemented in combination with the first, second, third, fourth, and/or fifth aspect of the first example method, though the example embodiments are not limited in this respect.

In a second example method of providing extensibility with regard to a context-aware digital personal assistant, the method comprises receiving a description of a capability of a target. Whether a digital personal assistant performs one or more operations that are configured to be triggered by at least one first aspect of a context of a user is controlled based at least in part on at least one second aspect of the context of the user that is different from the at least one first aspect. The one or more operations include at least one of notifying the user of the capability or implementing the capability on behalf of the user.

In a first aspect of the second example method, the second example method further includes determining that the user is not authorized to access the capability of the target based at least in part on the at least one second aspect of the context of the user. In accordance with the first aspect, controlling whether the digital personal assistant performs the one or more operations comprises controlling the digital personal assistant to not perform the one or more operations based at least in part on the user not being authorized to access the capability of the target.

A first example computer program product comprises a computer-readable storage medium having computer program logic recorded thereon for enabling a processor-based system to provide extensibility with regard to a context-aware digital personal assistant. The computer program logic comprises program logic for enabling the processor-based system to cause a digital personal assistant to perform one or more operations, including at least one of notifying a user of a capability of a target or implementing the capability on behalf of the user, in accordance with an inferred rule based at least in part on a context of the user in response to receipt of a description of the capability.

A second example computer program product comprises a computer-readable storage medium having computer program logic recorded thereon for enabling a processor-based system to provide extensibility with regard to a context-aware digital personal assistant. The computer program logic comprises program logic for enabling the processor-based system to cause a digital personal assistant to causing a digital personal assistant to provide a notification to a user based at least in part on a context of the user in response to receipt of a description of a capability of a target. The notification indicates that the capability of the target is available for selection by the user to cause implementation of the capability.

A third example computer program product comprises a computer-readable storage medium having computer program logic recorded thereon for enabling a processor-based system to provide extensibility with regard to a context-aware digital personal assistant in an enterprise environment. The computer program logic comprises program logic for enabling the processor-based system to cause a digital personal assistant to perform one or more operations, including at least one of notifying a user of a capability of an line-of-business application that is used in an enterprise or implementing the capability of the line-of-business application on behalf of the user, based at least in part on a context of the user in response to receipt of a description of the capability.

A fourth example computer program product comprises a computer-readable storage medium having computer program logic recorded thereon for enabling a processor-based system to provide extensibility with regard to a context-aware digital personal assistant. The computer program logic comprises program logic for enabling the processor-based system to controlling whether a digital personal assistant performs one or more operations that are configured to be triggered by at least one first aspect of a context of a user based at least in part on at least one second aspect of the context of the user that is different from the at least one first aspect in response to receipt of a description of a capability of a target. The one or more operations include at least one of notifying the user of the capability or implementing the capability on behalf of the user.

IV. Example Computer System

Figure 7:
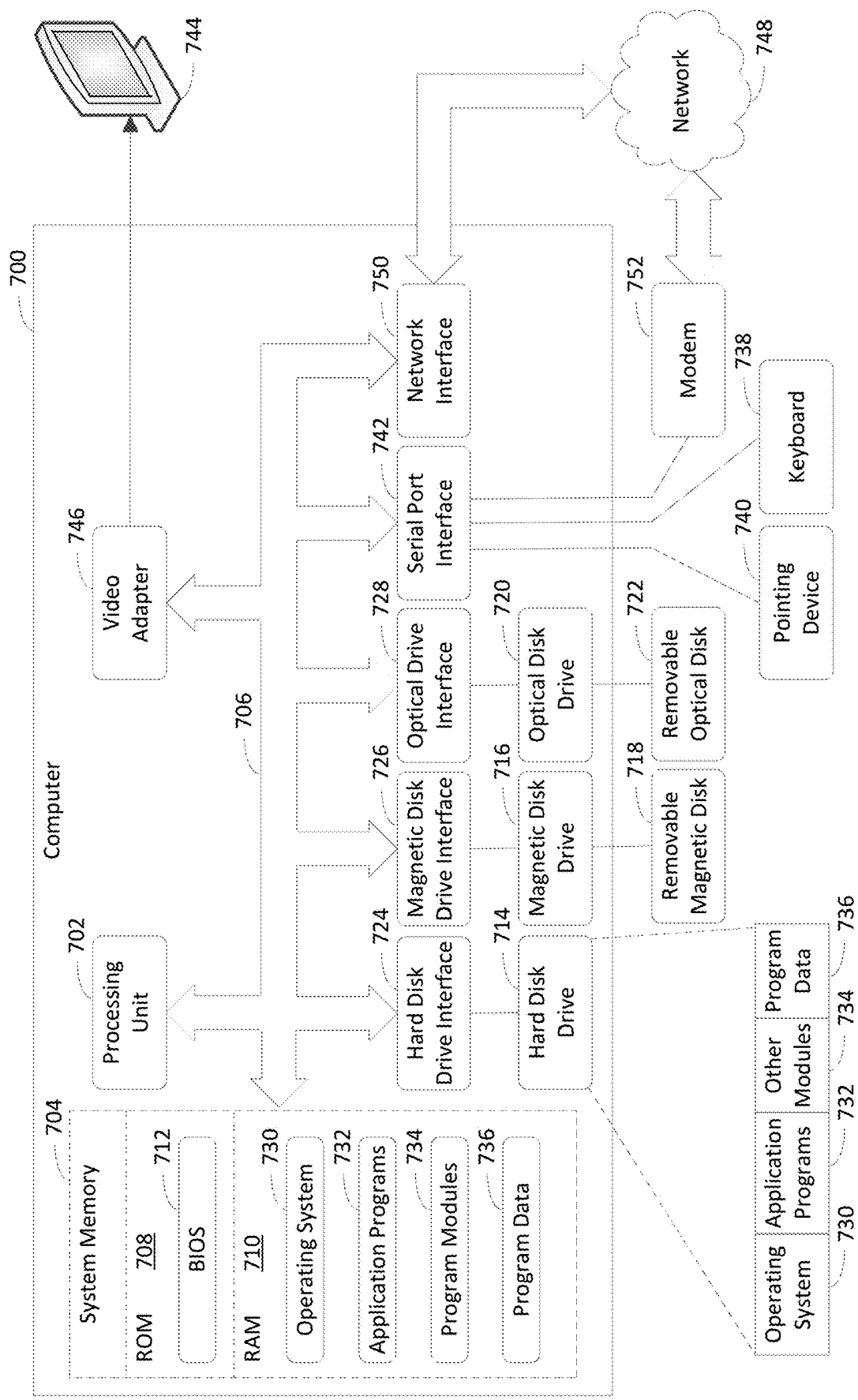
FIG. 7 depicts an example computer in which embodiments may be implemented.

FIG. 7 depicts an example computer 700 in which embodiments may be implemented. For instance, any one or more of user devices 102A-102M and/or any one or more of servers 106A-106N shown in FIG. 1, computing system 200 shown in FIG. 2, and/or computing system 600 shown in FIG. 6 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of digital personal assistants 108A-108M, context-aware extensibility logic 110, context-aware extensibility logic 202, signal collector 208, rules engine 210, context-aware extensibility logic 602, digital personal assistant 606, signal collector 608, rules engine 610, receipt logic 612, causation logic 614, context logic 616, determination logic 618, review logic 620, selection logic 622, flowchart 300 (including any step of flowchart 300), flowchart 400 (including any step of flowchart 400), and/or flowchart 500 (including any step of flowchart 500), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to provide extensibility with regard to a context-aware digital personal assistant, the system comprising:
    a memory;
    one or more processors coupled to the memory, the one or more processors configured to:
        crawl manifests of respective targets to determine which of the targets have different actions that are capable of being called externally to implement a capability of a respective target, wherein each manifest defines the actions that the one or more processors are to perform in order to implement the capability of the respective target and one or more contexts in which the actions are to be performed;
create one or more rules by using a machine learning technique to analyze past patterns of a user such that each rule specifies one or more conditions and an action that is to be performed when the one or more conditions are satisfied;
determine whether a user initiates performance of a first action;
review historical information to infer that one or more second actions, which are performed without assistance from the digital personal assistant, are performed with the first action at one or more historical time instances at which the first action is performed; and
cause the digital personal assistant to perform one or more operations, including at least one of notifying the user of a capability of a designated target or implementing the capability of the designated target on behalf of the user, in accordance with at least one of the one or more rules, based at least in part on a context of the user corresponding to at least one of the one or more contexts that are defined by the manifest and further based at least in part on a predetermination that the designated target has an action that is to be performed in accordance with the at least one of the one or more rules and that is capable of being called externally to implement the capability of the designated target, the one or more operations including notifying the user that the one or more second actions have been performed with the first action in the past, the capability including performance of the one or more second actions.

2. The system of claim 1, wherein the one or more processors are configured to cause the digital personal assistant to provide a notification to the user based at least in part on the context of the user, the notification indicating at least one action that the digital personal assistant is capable of performing to implement the capability on behalf of the user.

3. The system of claim 2, wherein the one or more processors are configured to cause the digital personal assistant to provide the notification as a request to the user based at least in part on the context of the user, the request soliciting instructions as to whether the digital personal assistant is to perform the at least one action to implement the capability on behalf of the user.

4. The system of claim 1, wherein the one or more processors are configured to cause the digital personal assistant to launch the designated target based at least in part on the context of the user to enable the designated target to implement the capability of the designated target on behalf of the user.

5. The system of claim 1, wherein the one or more processors are configured to:
cause the digital personal assistant to implement the capability on behalf of the user based at least in part on the context of the user; and
cause the digital personal assistant to notify the user that the digital personal assistant implemented the capability on behalf of the user.

6. The system of claim 1, wherein the manifests indicate that a plurality of targets have the capability; and
wherein the one or more processors are configured to:
select the designated target from the plurality of targets based on an inference from information regarding the user that the user prefers the designated target over the other targets to implement the capability; and
cause the digital personal assistant to at least one of notify the user that the designated target has the capability or implement the capability on behalf of the user using the designated target in response to selection of the designated target from the plurality of targets.

7. A method of providing extensibility with regard to a context-aware digital personal assistant, the method comprising:
crawling manifests of respective targets to determine which of the targets have different actions that are capable of being called externally to implement a capability of a respective target, wherein each manifest defines the actions to perform in order to implement the capability of the respective target and one or more contexts in which the actions are to be performed;
creating one or more rules by using a machine learning technique to analyze past patterns of a user such that each rule specifies one or more conditions and an action that is to be performed when the one or more conditions are satisfied;
determining whether the user initiates performance of a first action;
reviewing historical information to infer that one or more second actions, which are performed without assistance from the digital personal assistant, are performed with the first action at one or more historical time instances at which the first action is performed;
causing the digital personal assistant to provide a notification to the user based at least in part on at least one of the one or more rules and further based at least in part on a context of the user corresponding to at least one of the one or more contexts that are defined by the manifest and further based at least in part on a predetermination that a designated target has an action that is to be performed in accordance with the at least one of the one or more rules and that is capable of being called externally to implement a capability of the designated target, the notification indicating that that the capability of the designated target is available for selection by the user to cause implementation of the capability of the designated target; and
causing the digital personal assistant to notify the user that the one or more second actions have been performed with the first action in the past, the capability including performance of the one or more second actions.

8. The method of claim 7, wherein the notification is a text message;
wherein the method further comprises:
determining that the user is using a first device;
determining that the first device is not capable of receiving the text message; and
determining that a second device that is associated with the user is capable of receiving the text message; and
wherein causing the digital personal assistant to provide the notification comprises:
causing the digital personal assistant to provide the text message to the second device in response to determining that the first device is not capable of receiving the text message and further in response to determining that the second device is capable of receiving the text message.

9. The method of claim 7, further comprising:
determining that the user is associated with at least a first device and a second device; and
determining that the user is using the first device;
wherein causing the digital personal assistant to provide the notification comprises:
causing the digital personal assistant to provide the notification at the first device and not at the second device based at least in part on determining that the user is using the first device.

10. The method of claim 7, wherein causing the digital personal assistant to provide the notification comprises:
causing the digital personal assistant to provide the notification based at least in part on the user waking up.

11. The method of claim 7, wherein causing the digital personal assistant to provide the notification comprises:
causing the digital personal assistant to provide the notification based at least in part on the user leaving a location.

12. The method of claim 7, wherein the designated target is an application;
wherein the method further comprises:
determining that the application is not installed on a device of the user; and
wherein causing the digital personal assistant to provide the notification comprises:
causing the digital personal assistant to provide a link to a website from which the application is capable of being downloaded to the device.

13. The method of claim 7, wherein the designated target is an application;
wherein the method further comprises:
determining that the application is not installed on a device of the user; and
wherein causing the digital personal assistant to provide the notification comprises:
causing the digital personal assistant to notify the user that a second target has the capability.

14. A system to provide extensibility with regard to a context-aware digital personal assistant in an enterprise environment, the system comprising:
a memory;
one or more processors coupled to the memory, the one or more processors configured to:
crawl manifests of respective targets to determine which of the targets have different actions that are capable of being called externally to implement a capability of a respective target, wherein each manifest defines the actions that the one or more processors are to perform in order to implement the capability of the respective target and one or more contexts in which the actions are to be performed, the respective targets including a line-of-business application that is used in an enterprise;
create one or more rules by using a machine learning technique to analyze past patterns of a user such that each rule specifies one or more conditions and an action that is to be performed when the one or more conditions are satisfied;
determine that the user and one or more other users share at least one common attribute;
determine, from a history of the one or more other users, that a capability of the line-of-business application was implemented for the one or more other users; and
cause the digital personal assistant to perform one or more operations, including at least one of notifying the user of the capability of the line-of-business application or implementing the capability of the line-of-business application on behalf of the user, based at least in part on at least one of the one or more rules and further based at least in part on a context of the user corresponding to at least one of the one or more contexts that are defined by the manifest and further based at least in part on a determination that the user and the one or more other users share the at least one common attribute and further based at least in part on a determination that the capability of the line-of-business application was implemented for the one or more other users and further based at least in part on a predetermination that the line-of-business application has an action that is capable of being called externally to implement the capability of the line-of-business application.

15. The system of claim 14, wherein the one or more processors are configured to cause the digital personal assistant to perform the one or more operations based at least in part on the user being employed by the enterprise and further based at least in part on a duration for which the user is employed by the enterprise being less than or equal to a threshold duration of time.

16. The system of claim 15, wherein the one or more processors are configured to:
determine that the one or more operations are performed with regard to one or more specified users when the one or more specified users are employed by the enterprise for one or more respective durations that are less than the threshold duration of time;
cause the digital personal assistant to perform the one or more operations with regard to the user based at least in part on a determination that the one or more operations are performed with regard to the one or more specified users when the one or more specified users are employed by the enterprise for the one or more respective durations that are less than the threshold duration of time.

17. The system of claim 14, wherein the one or more processors are further configured to:
determine that the user is scheduled to meet with an entity at a specified time;
determine whether a difference between the specified time and a current time is less than or equal to a threshold amount of time; and
cause the digital personal assistant to perform the one or more operations based at least in part on a determination that the difference between the specified time and the current time is less than or equal to the threshold amount of time.

18. The system of claim 14, wherein the one or more processors are further configured to:
determine whether the line-of-business application is accessible on a device of the user; and
cause the digital personal assistant to provide a procedural workflow that identifies one or more actions to be performed to cause the line-of-business application to be accessible on the device based at least in part on a determination that the line-of-business application is not accessible on the device.

19. The system of claim 14, wherein the one or more processors are configured to:
determine whether the line-of-business application is accessible on a device of the user; and cause the digital personal assistant to at least one of notify the user that a specified target that is different from the line-of-business application has the capability or implement the capability using the specified target on behalf of the user, based at least in part on a determination that the line-of-business application is not accessible on the device.

20. The system of claim 1, wherein the notification is a text message; and
wherein the one or more processors are configured to:
determine that the user is using a first device;
determine that the first device is not capable of receiving the text message;
determine that a second device that is associated with the user is capable of receiving the text message; and
cause the digital personal assistant to provide the text message to the second device in response to a determination that the first device is not capable of receiving the text message and further in response to a determination that the second device is capable of receiving the text message.

21. The system of claim 14, wherein the manifests indicate that a plurality of targets have the capability; and
wherein the one or more processors are configured to:
select the designated target from the plurality of targets based on an inference from information regarding the user that the user prefers the designated target over the other targets to implement the capability; and
cause the digital personal assistant to at least one of notify the user that the designated target has the capability or implement the capability on behalf of the user using the designated target in response to selection of the designated target from the plurality of targets.

* * * * *